United States Patent
Luo et al.

(10) Patent No.: US 11,212,422 B2
(45) Date of Patent: Dec. 28, 2021

(54) COLOR GAMUT MAPPING METHOD AND APPARATUS

(71) Applicant: Huawei Technologies Co., Ltd., Shenzhen (CN)

(72) Inventors: Ming Ronnier Luo, Hangzhou (CN); Lihao Xu, Hangzhou (CN); Lixian Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/031,020

(22) Filed: Sep. 24, 2020

(65) Prior Publication Data

US 2021/0006686 A1 Jan. 7, 2021

Related U.S. Application Data

(63) Continuation of application No. PCT/CN2018/086928, filed on May 15, 2018.

(30) Foreign Application Priority Data

Apr. 16, 2018 (CN) .......................... 201810340289.X

(51) Int. Cl.
    *H04N 1/60*     (2006.01)
    *G06T 11/00*     (2006.01)

(52) U.S. Cl.
    CPC .......... *H04N 1/6061* (2013.01); *G06T 11/001* (2013.01)

(58) Field of Classification Search
    CPC .......... H04N 1/6061; H04N 9/67; H04N 9/64; H04N 1/60; G06T 11/001
    See application file for complete search history.

(56) References Cited

U.S. PATENT DOCUMENTS

2006/0188156 A1   8/2006   Kwak et al.
2007/0223018 A1   9/2007   Hammers et al.
(Continued)

FOREIGN PATENT DOCUMENTS

CN    1825974 A    8/2006
CN    1951101 A    4/2007
(Continued)

OTHER PUBLICATIONS

Zhao, B., et al., "Colour gamut mapping using vividness scale," Electronic Imaging, vol. 2019, No. 14, Jan. 13, 2019, XP055769524, 7 pages.
(Continued)

*Primary Examiner* — Christopher Wait
(74) *Attorney, Agent, or Firm* — Conley Rose, P.C.

(57) ABSTRACT

A color gamut mapping method and apparatus, includes obtaining a to-be-processed image, obtaining lightness and chroma information of a target color gamut, and mapping a lightness value and a chroma value of a pixel in the to-be-processed image to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

20 Claims, 21 Drawing Sheets

(56) References Cited

U.S. PATENT DOCUMENTS

| | | |
|---|---|---|
| 2008/0291476 A1 | 11/2008 | Higuchi |
| 2009/0284774 A1 | 11/2009 | Kishimoto |
| 2010/0110312 A1 | 5/2010 | Muijs et al. |
| 2013/0241931 A1 | 9/2013 | Mai et al. |
| 2013/0243312 A1 | 9/2013 | Sato |
| 2015/0332653 A1* | 11/2015 | Kakinuma ............ H04N 1/628 345/600 |
| 2016/0241829 A1 | 8/2016 | Qu et al. |
| 2016/0277639 A1 | 9/2016 | Arai |
| 2017/0061594 A1 | 3/2017 | Suzuki |
| 2018/0322679 A1 | 11/2018 | Kunkel et al. |
| 2019/0158894 A1 | 5/2019 | Lee et al. |
| 2019/0387132 A1 | 12/2019 | Rao |

FOREIGN PATENT DOCUMENTS

| | | |
|---|---|---|
| CN | 101312487 A | 11/2008 |
| CN | 101543039 A | 9/2009 |
| CN | 101582977 A | 11/2009 |
| CN | 102177720 A | 9/2011 |
| CN | 103310468 A | 9/2013 |
| CN | 103327323 A | 9/2013 |
| CN | 105009567 A | 10/2015 |
| CN | 105027547 A | 11/2015 |
| CN | 105933616 A | 9/2016 |
| CN | 106454301 A | 2/2017 |
| CN | 106488078 A | 3/2017 |
| CN | 106657847 A | 5/2017 |
| CN | 107147942 A | 9/2017 |
| CN | 107888893 A | 4/2018 |
| EP | 1909486 A2 | 4/2008 |
| EP | 3136723 A1 | 3/2017 |
| JP | 2009284107 A | 12/2009 |
| WO | 2018004291 A1 | 1/2018 |

OTHER PUBLICATIONS

Berns, R., "Extending CIELAB: Vividness, V*ab, depth, D*ab, and clarity, T*ab," Color Research and Application, vol. 39, No. 4, Aug. 20, 2013, XP055769548, 9 pages.

* cited by examiner

COLOR GAMUT MAPPING METHOD AND APPARATUS

CROSS-REFERENCE TO RELATED APPLICATIONS

This application is a continuation of International Patent Application No. PCT/CN2018/086928 filed on May 15, 2018, which claims priority to Chinese Patent Application No. 201810340289.X filed on Apr. 16, 2018. The disclosures of the aforementioned applications are hereby incorporated by reference in their entireties.

TECHNICAL FIELD

This application relates to the field of image processing, and in particular, to a color gamut mapping method and apparatus.

BACKGROUND

With advancement of science and technology and improvement of people's living standards, various color digital image devices have been widely used in people's daily life and work. However, color distortion frequently occurs when a color image is transmitted between digital image display devices because different types of digital image display devices have different color generation mechanisms and color gamut ranges, or the like. For example, when an image is transmitted from one device to another device for display, a phenomenon such as display distortion of the image may occur on the other device because the two devices may have different image color display capabilities. In a process of transmitting an image from one device to another device for display, a color management system is an effective technical solution to this problem. A color gamut (for example, chroma and value) mapping method in the color management system is a core of the color management system. However, a current color gamut mapping method has comparatively complex calculation and a comparatively low calculation speed, and requires a comparatively high processing capability of a device. In addition, an effect of a processed image is also poor, some details of a source image may be lost, and so on. This affects user experience and development of industries such as textiles, printing, computer-aided designs, e-commerce, and telemedicine.

SUMMARY

This application provides a color gamut mapping method and apparatus, to reduce calculation complexity of color gamut mapping, ensure quality of an image obtained by mapping a source image to a color gamut of a target device, and prevent a problem such as blurring of details of the image mapped to the target device. In this way, the image obtained through color gamut mapping is closer to the source image, thereby improving user experience.

According to a first aspect, a color gamut mapping method is provided, including obtaining a to-be-processed image, obtaining lightness and chroma information of a target color gamut, and mapping a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

The mapping end point may be a point located on a lightness axis, and a location of the mapped pixel in the color gamut is on a connection line between the mapping end point and a location of the mapped-from pixel in the color gamut or on an extension line of the connection line. The mapped pixel and the mapped-from pixel are at a same location in the image. It should be noted that the location of the mapping end point does not indicate a mapping direction, that is, does not indicate whether the location of the mapped pixel in the color gamut is closer to the mapping end point or farther away from the mapping end point relative to the location of the mapped-from pixel in the color gamut.

According to the color gamut mapping method provided in the first aspect, in a process of transferring the to-be-processed image (a source image) to the target color gamut for display, color gamut mapping may be performed based on vividness and the lightness and chroma information of the target color gamut. To be specific, lightness values and chroma values of all pixels in the color gamut of the to-be-processed image are mapped to the point with the minimum lightness (the mapping end point) in the target color gamut. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, where the mapping end point indicates a mapping direction and a mapping distance, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

In a possible implementation of the first aspect, obtaining a to-be-processed image includes obtaining a current image, performing lightness mapping on a pixel in a color gamut of the current image, to obtain a first color gamut, where a lightness range of the first color gamut is the same as that of the target color gamut, and mapping the pixel in the color gamut of the current image to the first color gamut, to obtain the to-be-processed image.

In a possible implementation of the first aspect, in a process of performing lightness mapping on the pixel in the color gamut of the current image, chroma of the pixel in the color gamut of the current image remains unchanged.

In a possible implementation of the first aspect, the method further includes mapping a lightness value and a chroma value of a first pixel in a color gamut of the processed image to the target color gamut using a target point that corresponds to the first pixel and that is in the target color gamut as a mapping end point, to obtain a target image, where the target point is located on a lightness axis of the target color gamut, and a lightness value of the target point is the same as that of the first pixel.

In a possible implementation of the first aspect, mapping a lightness value and a chroma value of a pixel in the to-be-processed image, to obtain a processed image corresponding to the target color gamut includes performing mapping based on the following formula, to obtain the processed image corresponding to the target color gamut:

$$\overrightarrow{EP'} = \begin{cases} \overline{EP}; \overline{EP} \le k*\overline{EP_d} \\ k*\overline{EP_d} + \dfrac{\overline{EP} - k*\overline{EP_d}}{\overline{EP_s} - k*\overline{EP_d}} *(1-k)*\overline{EP_d}; \overline{EP} > k*\overline{EP_d} \end{cases},$$

where E is the mapping end point, lightness of the point E is the minimum lightness value of the target color gamut, chroma of the point E is 0, P is the pixel in the color gamut of the to-be-processed image, $\overline{EP}$ is a distance between P and E, $P_d$ is an intersection point between $\overline{EP}$ and a boundary of the target color gamut, $\overline{EP_d}$ is a distance between E and $P_d$, $P_s$ is an intersection point between $\overline{EP}$ and a boundary of the color gamut of the to-be-processed image, $\overline{EP_s}$ is a distance between E and $P_s$, P' is a point that is in the processed image corresponding to the target color gamut and that is obtained by mapping P using the foregoing formula, $\overline{EP'}$ is a distance between E and P', and k is a coefficient with a value range of 0.7≤k≤0.95, and P' may be a point on $\overline{EP}$ or on an extension line of $\overline{EP}$.

In a possible implementation of the first aspect, performing lightness mapping on a pixel in a color gamut of the current image, to obtain a first color gamut includes performing lightness mapping on the pixel in the color gamut of the current image based on the following formula, to obtain the first color gamut:

$$L'_C = \dfrac{L_C - \min(L_o)}{\max(L_o) - \min(L_o)} *(\max(L_r) - \min(L_r)) + \min(L_r),$$

where C is the pixel in the color gamut of the current image, $L_C$ is lightness of the pixel C, $\min(L_o)$ is a minimum lightness value of the color gamut of the current image, $\max(L_o)$ is a maximum lightness value of the color gamut of the current image, $\min(L_r)$ is the minimum lightness value of the target color gamut, $\max(L_r)$ is a maximum lightness value of the target color gamut, C' is a point obtained by mapping C using the foregoing formula, and $L_C'$ is lightness of C'.

In a possible implementation of the first aspect, mapping the pixel in the color gamut of the current image to the first color gamut, to obtain the to-be-processed image includes mapping the pixel in the color gamut of the current image to the first color gamut based on the following formula, to obtain the to-be-processed image:

$$\overrightarrow{MN'} = \begin{cases} \overline{MN}; \overline{MN} \le t*\overline{MS_1} \\ t*\overline{MS_1} + \dfrac{\overline{MN} - t*\overline{MS_1}}{\overline{MS_2} - t*\overline{MS_1}} *(1-t)*\overline{MS_1}; \overline{MN} > t*\overline{MS_1} \end{cases},$$

where M is the mapping end point, lightness of M is half of a sum of the minimum lightness value and the maximum lightness value of the color gamut of the current image, chroma of M is 0, N is the pixel in the color gamut of the current image, $\overline{MN}$ is a distance between the point M and the point N, $S_1$ is an intersection point between $\overline{MN}$ and a boundary of the first color gamut, $S_2$ is an intersection point between $\overline{MN}$ and a boundary of the color gamut of the current image, $\overline{MS_1}$ is a distance between the point M and the point $S_1$, $\overline{MS_2}$ is a distance between the point M and the point $S_2$, N' is a point obtained by mapping N, $\overline{MN'}$ is a distance between the point M and N', and t is a coefficient with a value range of 0.7≤t≤0.95, and N' may be a point on $\overline{MN}$ or on an extension line of $\overline{MN}$.

In a possible implementation of the first aspect, mapping a lightness value and a chroma value of a first pixel in a color gamut of the processed image to the target color gamut using a target point that corresponds to any pixel and that is in the target color gamut as a mapping end point, to obtain a target image includes mapping the first pixel to the target color gamut based on the following formula, to obtain the target image:

$$\overrightarrow{AZ'} = \begin{cases} \overline{AZ}; \overline{AZ} \le k*\overline{AX_1} \\ k*\overline{AX_1} + \dfrac{\overline{AZ} - k*\overline{AX_1}}{\overline{AX_2} - k*\overline{AX_1}} *(1-k)*\overline{AX_1}; \overline{AZ} > k*\overline{AX_1} \end{cases},$$

where A is the mapping end point, Z is the first pixel, lightness of the point A is the same as that of Z, chroma of the point A is 0, $\overline{AZ}$ is a distance between the point A and the point Z, $X_1$ is an intersection point between $\overline{AZ}$ and a boundary of the target color gamut, $\overline{AX_1}$ is a distance between the point A and the point $X_1$, $X_2$ is an intersection point between $\overline{AZ}$ and a boundary of the color gamut of the processed image, $\overline{AX_2}$ is a distance between the point A and the point $X_2$, Z' is a point obtained by mapping Z, $\overline{AZ}$ ' is a distance between A and Z', and k is a coefficient with a value range of 0.7≤k≤0.95, and Z' may be a point on $\overline{AZ}$ or on an extension line of $\overline{AZ}$.

In a possible implementation of the first aspect, a lightness range of the target color gamut is within a lightness range of the color gamut of the to-be-processed image, and/or a chroma range of the target color gamut is within a chroma range of the color gamut of the to-be-processed image.

According to a second aspect, a color gamut mapping method is provided, including obtaining a to-be-processed image, obtaining lightness and chroma information of a target color gamut, and mapping a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

According to the color gamut mapping method provided in the second aspect, in a process of transferring the to-be-processed image to the target color gamut for display, color gamut mapping may be performed based on vividness and the lightness and chroma information of the target color gamut. To be specific, lightness values and chroma values of all pixels in the color gamut of the to-be-processed image are mapped to the target color gamut using the point with the minimum lightness in the target color gamut as the mapping end point. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

In a possible implementation of the second aspect, mapping a lightness value and a chroma value of a pixel in the to-be-processed image, to obtain a processed image corresponding to the target color gamut includes mapping a pixel G in the color gamut of the to-be-processed image to a point H, to obtain color gamut information for displaying the to-be-processed image on the target device, and obtain the processed image corresponding to the target color gamut, where H is an intersection point between $\overline{EG}$ and a boundary of the color gamut of the target device, and E is the point with the minimum lightness in the target color gamut.

In a possible implementation of the second aspect, obtaining a to-be-processed image includes obtaining a current image, determining a connection line between a point with minimum lightness in a color gamut of the current image and a point with maximum chroma in the color gamut of the current image as a color gamut boundary between the point with the minimum lightness in the color gamut of the current image and the point with the maximum chroma in the color gamut of the current image, to obtain a second color gamut, and mapping a pixel in the color gamut of the current image to the second color gamut, to obtain the to-be-processed image.

In a possible implementation of the second aspect, obtaining a to-be-processed image includes obtaining a current image, replacing a boundary that is of a color gamut of the current image and that is between a point with minimum lightness in the color gamut of the current image and a point with maximum chroma in the color gamut of the current image with a connection line between the point with the minimum lightness in the color gamut of the current image and the point with the maximum chroma in the color gamut of the current image, to obtain a second color gamut, and mapping a pixel in the color gamut of the current image to the second color gamut, to obtain the to-be-processed image.

In a possible implementation of the second aspect, the method further includes mapping a lightness value and a chroma value of a second pixel in a color gamut of the processed image to the target color gamut using a target point that corresponds to the second pixel and that is in the target color gamut as a mapping end point, to obtain a target image, where the target point is located on a lightness axis of the target color gamut, and a lightness value of the target point is the same as that of the second pixel.

In a possible implementation of the second aspect, mapping a lightness value and a chroma value of a pixel in the to-be-processed image, to obtain a processed image corresponding to the target color gamut includes performing mapping based on the following formula:

$$\overline{EG'} = \overline{EH} * \left( \frac{\overline{EG}}{\overline{EH_1}} - \frac{\overline{ER}}{\overline{EU}} * \frac{\overline{GH_1}}{\overline{H_2H_1}} \right),$$

where E is the mapping end point, lightness of the point E is the minimum lightness value of the color gamut of the target device, chroma of the point E is 0, G is any pixel in the color gamut of the to-be-processed image, $\overline{EG}$ is a distance between the points E and G, H is an intersection point between an extension line of $\overline{EG}$ and a boundary of the target color gamut, $\overline{EH}$ is a distance between the points E and H, $H_1$ is an intersection point between an extension line of $\overline{EG}$ and a color gamut boundary between a point with maximum lightness in the color gamut of the to-be-processed image and a point with maximum chroma in the color gamut of the to-be-processed image, $\overline{GH_1}$ is a distance between the points G and $H_1$, $\overline{EH_1}$ is a distance between the points E and $H_1$, R is a point with minimum lightness in the color gamut of the to-be-processed image, $\overline{ER}$ is a distance between the points E and R, U is the point with the maximum lightness in the color gamut of the to-be-processed image, $\overline{EU}$ is a distance between the points E and U, $H_2$ is an intersection point between $\overline{EG}$ and a color gamut boundary between the point with the minimum lightness in the color gamut of the to-be-processed image and the point with the maximum chroma in the color gamut of the to-be-processed image, $\overline{H_1H_2}$ is a distance between the points $H_1$ and $H_2$, G' is a point obtained by mapping G, $\overline{EG'}$ is a distance between E and G', and G' is obtained by performing color gamut mapping on the point G based on vividness and using the foregoing formula (11), and G' may be a point on $\overline{EG}$ or on an extension line of $\overline{EG}$.

In a possible implementation of the second aspect, mapping a pixel in the color gamut of the current image to the second color gamut, to obtain the to-be-processed image includes mapping the pixel in the color gamut of the current image to the second color gamut based on the following formula, to obtain the to-be-processed image:

$$\overline{OQ} = \begin{cases} \overline{OG}; \overline{OG} \leq y * \overline{OW_1} \\ y * \overline{OW_1} + \frac{\overline{OG} - y * \overline{OW_1}}{\overline{OW_2} - y * \overline{OW_1}} * (1-y) * \overline{OW_1}; \overline{OG} > y * \overline{OW_1} \end{cases},$$

where G is any pixel in the color gamut of the current image, O is the mapping end point, a lightness value of O is the same as that of G, a chroma value of O is 0, $W_1$ is an intersection point between $\overline{OG}$ and a boundary of the second color gamut, $W_2$ is an intersection point between $\overline{OG}$ and a boundary of the color gamut of the current image, $\overline{OG}$ is a distance between the point O and the point G, $\overline{OW_1}$ is a distance between the point O and the point $W_1$, $\overline{OW_2}$ is a distance between the point O and the point $W_2$, Q is a pixel obtained by mapping G, $\overline{OQ}$ is a distance between O and Q, and y is a coefficient with a value range of $0.7 \leq y \leq 0.95$, and Q may be located on $\overline{OG}$ or on an extension line of $\overline{OG}$.

In a possible implementation of the second aspect, mapping a lightness value and a chroma value of a second pixel in a color gamut of the processed image to the target color gamut using a target point that corresponds to the second pixel and that is in the target color gamut as a mapping end point, to obtain a target image includes: mapping the second pixel based on the following formula, to obtain the target image:

$$\overline{BF'} = \begin{cases} \overline{BF}; \overline{BF} \leq i*\overline{BD_2} \\ i*\overline{BD_2} + \dfrac{\overline{BF} - i*\overline{BD_2}}{(1-i)*\overline{BD_2}} * (\overline{BD_1} - i*\overline{BD_2}); \overline{BF} > i*\overline{BD_2} \end{cases},$$

where F is the second pixel, lightness of a point B is the same as that of F, chroma of the point B is 0, $\overline{BF}$ is a distance between the point B and the point F, $D_1$ is an intersection point between $\overline{BF}$ and a boundary of the target color gamut, B is the target point, $\overline{BD_1}$ is a distance between the point B and the point $D_1$, $D_2$ is an intersection point between $\overline{BF}$ and a boundary of the color gamut of the processed image, $\overline{BD_2}$ is a distance between the point B and the point $D_2$, F' is a point obtained by mapping F, $\overline{BF'}$ is a distance between the point B and F', and i is a coefficient with a value range of $0.4 \leq i \leq 0.7$, and in a possible implementation of the second aspect, a lightness range of the color gamut of the to-be-processed image is within a lightness range of the color gamut of the target device, and/or a chroma range of the color gamut of the to-be-processed image is within a chroma range of the color gamut of the target device, and F' may be a point on $\overline{BF}$ or on an extension line of $\overline{BF}$.

In a possible implementation of the second aspect, a lightness range of the color gamut of the to-be-processed image is within a lightness range of the color gamut of the target device, and/or a chroma range of the color gamut of the to-be-processed image is within a chroma range of the color gamut of the target device.

According to a third aspect, a color gamut mapping apparatus is provided, including an obtaining module and a processing module configured to support the apparatus in performing a function in any one of the first aspect, the second aspect, or the possible implementations of the first aspect and the second aspect. The function may be implemented by hardware or by hardware executing corresponding software. The hardware or the software includes one or more modules corresponding to the foregoing function.

According to a fourth aspect, a color gamut mapping apparatus is provided, including a processor, a memory, and a transceiver configured to support the terminal device in performing a corresponding function in the foregoing method. The processor, the memory, and the transceiver are connected through communication. The memory stores an instruction. The transceiver is configured to send/receive a signal under driving of the processor. The processor is configured to invoke the instruction to implement the color gamut mapping method in the first aspect, the second aspect, or the implementations of the first aspect and the second aspect.

According to a fifth aspect, a terminal device is provided, including a memory configured to store a program, and a processor configured to execute the program stored in the memory. When the program is executed, the processor is configured to perform any one of the first aspect, the second aspect, or the possible implementations of the first aspect and the second aspect.

According to a sixth aspect, a computer readable storage medium is provided configured to store a computer program. The computer program includes an instruction used to perform the method in any one of the first aspect, the second aspect, or the possible implementations of the first aspect and the second aspect.

According to a seventh aspect, a system chip is provided, including a processing unit and a communications unit. The processing unit may execute a computer instruction such that a chip in the terminal performs the method in any one of the first aspect, the second aspect, or the possible implementations of the first aspect and the second aspect.

According to an eighth aspect, a computer program product is provided. The product includes an instruction used to perform the method in any one of the first aspect, the second aspect, or the possible implementations of the first aspect and the second aspect.

DESCRIPTION OF EMBODIMENTS

The following describes technical solutions of this application with reference to accompanying drawings.

Figure 1:
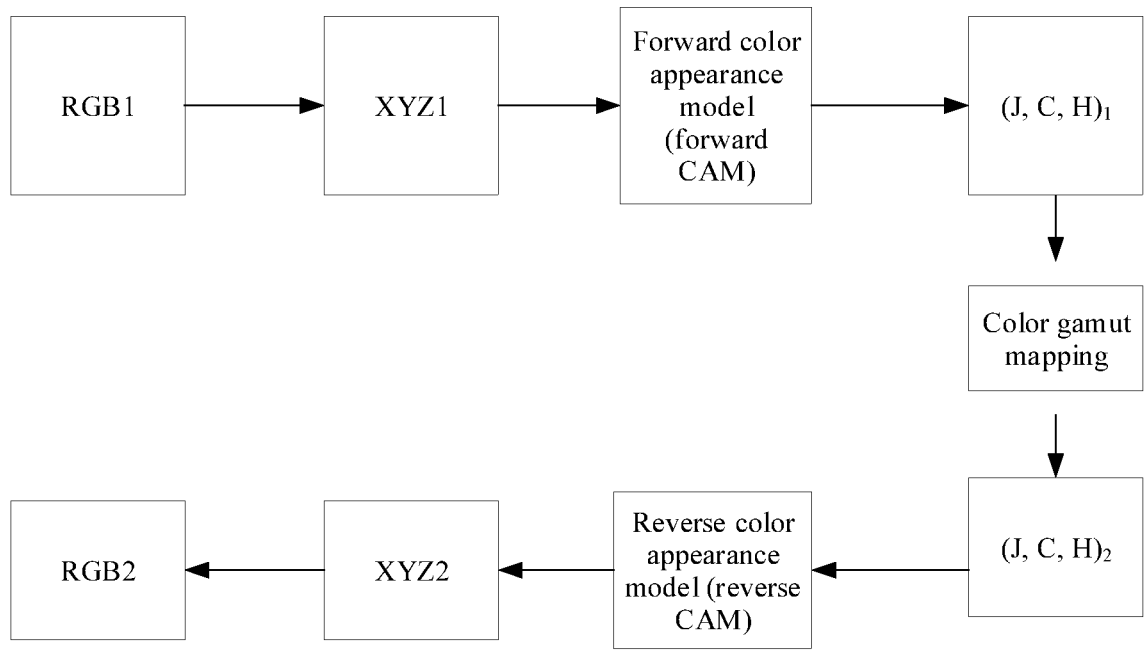
FIG. 1 is a schematic flowchart of processing an image by a color management system.

With advancement of science and technology and improvement of people's living standards, various color digital image devices have been widely used in people's daily life and work. However, color distortion frequently occurs when a color image is transmitted between digital image display devices because different types of digital image display devices have different color generation mechanisms and color gamuts (including chroma, lightness, and hue angles), or the like. For example, when an image is transmitted from one device to another device for display, a phenomenon such as display distortion of the image may occur on the other device because the two devices may have different image display capabilities. In a process of transmitting an image from one device to another device for display, a color management system is an effective technical solution to this problem. FIG. 1 is a schematic flowchart of processing an image by a color management system. Red, green, blue 1 (RGB1) represents a pixel value of each point in an image displayed on a device 1. XYZ1 represents an absolute chroma value of each pixel in an image on the device 1 that is obtained through color space conversion. A forward color appearance model (forward color appearance model, forward CAM) may convert the absolute chroma value into color information perceptible to human eyes, that is, a color appearance (which may also be referred to as a color gamut) (J (lightness), C (chroma), and H (a hue angle)). $(J, C, H)_1$ represents color appearance information, displayed on the device 1, of the image. $(J, C, H)_1$ is converted into color appearance information $(J, C, H)_2$ on a device 2 through color gamut mapping. $(J, C, H)_2$ is processed by a reverse color appearance model (reverse CAM) on the device 2 to obtain an absolute chroma value XYZ2 of each pixel in an image on the device 2. Finally, a pixel value RGB2 of each point in the image displayed on the device 2 is obtained. The foregoing process shown in FIG. 1 is an RGB conversion process of a same image between different devices.

A display device can display a limited range of colors. Therefore, for two display devices with different color display capabilities, a display device 2 may be unable to display an image color (JCh) 1 that can be displayed on a display device 1. Therefore, in a process of transferring a color of an image, the color of the image needs to be processed using a color management system, to ensure a minimum visual perception difference when the source image is transferred to a target device for display. A color gamut mapping method in the color management system is a core of the color management system, plays an important role in the process of transferring the color of the image, and largely determines a display effect of the image transferred from one device to another device. Because a wide color gamut display (a display device that can display a comparatively wide color gamut range) is not popularized before, most color gamut mapping algorithms are specific to researches on a mapping from a wider color gamut to a narrower color gamut. To be specific, an existing color gamut mapping algorithm is mainly a color gamut compression algorithm (GCA). The color GCA is mainly used in a process of transferring an image from a device with a stronger display capability (a device that can display a wider color gamut range) to a device with a weaker display capability (a device that can display a narrower color gamut range).

Currently, there are mainly two color GCAs. One is SGCK. The SGCK is an image color GCA recommended by the International Commission on Illumination (CIE). The SGCK algorithm mainly maps chroma and value (lightness) in a color gamut. Steps of the SGCK algorithm mainly include chroma-related value compression and a process of simultaneously performing chroma and value compression. The SGCK algorithm first maps, based on chroma of a to-be-mapped color (a source color gamut) of a source image (an image displayed on a source device), value (lightness) of the to-be-mapped color to a value (lightness) range of a target device using a sigmoid function lookup table, and then maps a color obtained through lightness mapping to a color gamut of the target device through segment compression on a constant-hue plane. Specific steps are as follows.

I. Chroma-related lightness compression on the source image, mainly including the following steps.

1. Keep a hue angle of the color gamut of the source image unchanged.

2. Map a pixel in the source image to the lightness range of the color gamut of the target device using the following formula (1):

$$L^*_r = (1-P_C)L^*_O + P_C L^*_S. \tag{1}$$

In the formula (1), O represents the pixel in the color gamut of the source image (the source color gamut), r represents a mapped pixel, $P_C$ is an amount related to lightness of the source color gamut, $L^*_O$ is lightness of the pixel O in the source color gamut, $L^*_r$ is lightness of a pixel obtained by mapping $L^*_O$ using the formula (1), and $L^*_S$ is lightness obtained by mapping $L^*_O$ to the target color gamut using the sigmoid function lookup table.

$P_C$ in the formula (1) may be obtained using the following formula (2):

$$P_C = 1 - ((C^{*3})/C^{*3} + 5 \times 10^5)^{1/2}. \tag{2}$$

In the formula (2), $C^{*3}$ represents a cubic power of a chroma value of the point O.

The sigmoid function lookup table may be obtained using a cumulative normal distribution function shown in a formula (3):

$$S_i = \sum_{n=0}^{n=i} \frac{1}{\sqrt{2\pi}\,\sigma} e^{-\frac{\left(\frac{100n}{m} - x_0\right)^2}{2\sigma^2}}. \quad (3)$$

In the formula (3), i is an input value, a value range of i is 0, 1, 2, 3, ..., m, a value of m is at least 100, $x_0$ and $\sigma$ are a mean and a variance of cumulative normal distribution, and values of $x_0$ and $\sigma$ are related to minimum lightness of the target color gamut. The lightness of the source color gamut is normalized within the value range of i, the lightness of the source color gamut is used as an input i, and then the lookup table $S_1$ is mapped to a range of the target color gamut. A sigmoid function mapping table about lightness may be established, as shown in a formula (4):

$$S_{LUT} = \frac{(S_i - \min(S))}{(\max(S) - \min(S))}(L^*_{maxr} - L^*_{minr}) + L^*_{minr}. \quad (4)$$

In the formula (4), $S_{LUT}$ represents the sigmoid function mapping table, $S_1$ represents a lightness value calculated for a lightness input i in the formula (3), min(S) represents a minimum value of $S_1$ in the formula (3), max(S) represents a maximum value of $S_1$ in the formula (3), $L^*_{min\ r}$ represents a minimum lightness value of the target color gamut, and $L^*_{max\ r}$ represents a maximum lightness value of the target color gamut.

Then a value of $L^*_S$ may be obtained by performing interpolation on $S_{LUT}$ and $L^*_O$ using a formula (5):

$$L^*_S = 100(L^*_O - L^*_{min\ O})/(L^*_{max\ O} - L^*_{min\ O}). \quad (5)$$

In the formula (5), $L^*_O$ is the lightness of the pixel O in the source color gamut, $L^*_{min\ O}$ is a minimum lightness value of the pixel in the source color gamut, and $L^*_{max\ O}$ is a maximum lightness value of the pixel in the source color gamut.

II. After the foregoing chroma-related lightness compression is performed, a color of an image obtained through lightness compression is mapped to the color gamut of the target device on the constant-hue plane. A specific mapping formula is shown in a formula (6):

$$d_r = \begin{cases} d_o; d_o \leq 0.9 d_{gr} \\ 0.9 d_{gr} + (d_o - 0.9 d_{gr}) 0.1 d_{gr}/(d_{go} - 0.9 d_{gr}); d_o > 0.9 d_{gr} \end{cases}. \quad (6)$$

Figure 2:
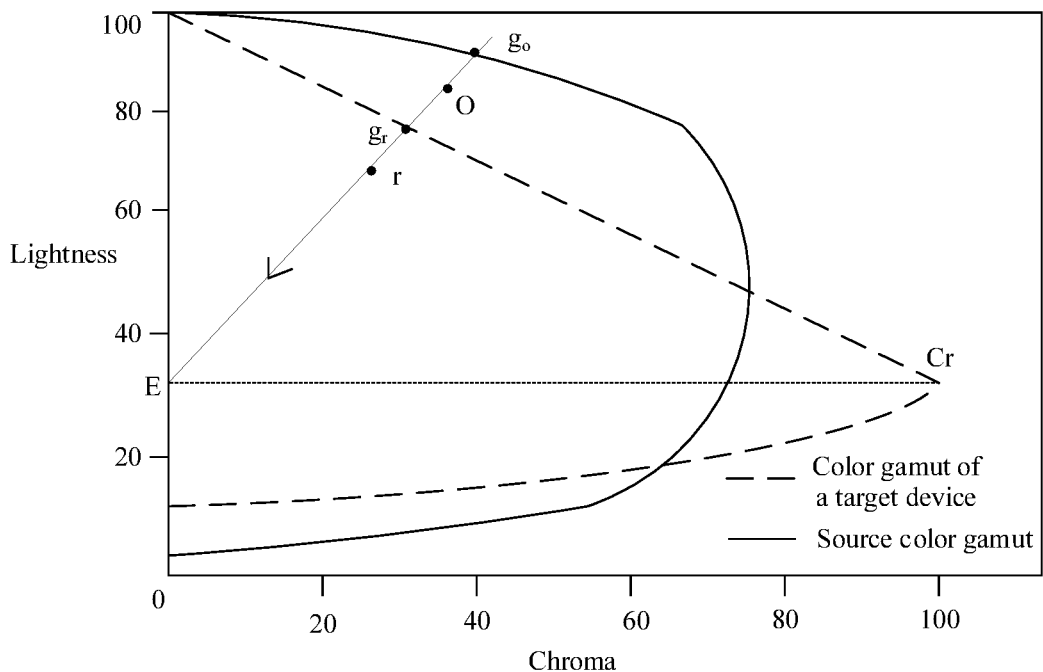
FIG. 2 is a schematic diagram of performing chroma and lightness compression on a source image using a chroma-dependent sigmoidal lightness mapping and CUSP knee scaling (SGCK) algorithm.

In the formula (6), g represents a color gamut boundary, o represents the source color gamut, r represents the color gamut of the target device (or target color gamut), and d represents a distance from a mapping end point E. FIG. 2 is a schematic diagram of performing chroma and lightness compression on the source image using the SGCK algorithm. In FIG. 2, a point O represents a pixel in the color gamut of the source image (the source color gamut), r represents a pixel obtained by performing lightness and chroma compression on the point O using the formula (6), a dashed line represents the color gamut of the target device, a solid line represents the source color gamut, a location of a mapping end point E is a point whose chroma is 0 and whose lightness is equal to a lightness value corresponding to a point Cr (a CUSP point) with maximum chroma in the target color gamut, $d_o$ represents a distance from O to E, $d_{gr}$ represents a distance from an intersection point $g_r$ between a boundary of the target color gamut and a connection line between O and E to the point E, and $d_{go}$ represents a distance from an intersection point $g_o$ between a boundary of the source color gamut and a connection line (an extension line) between O and E to the point E.

It can be learned from the formula (6) that, if a color obtained by performing lightness compression on a to-be-mapped color is within 90% of the range of the color gamut of the target device, a mapped color is consistent with the color obtained through value compression. However, for a color that is obtained through value compression and that is beyond 90% of the range of the color gamut of the target device, the color is transformed into 10%, close to a boundary, of the range of the color gamut of the target device using the linear compression formula (6), to complete color gamut mapping transformation.

It can be learned from the SGCK algorithm that the sigmoid function mapping table needs to be used in the lightness compression process, and a value of $L^*_S$ needs to be obtained through interpolation calculation. Consequently, a mapping algorithm is excessively complex, and a calculation speed is low. In addition, the SGCK algorithm focuses on a case with a significant lightness difference (for example, a printing process), and is not particularly suitable for the display field. An SGCK-based color gamut mapping method is to perform mapping in a direction towards a high-chroma color, and a basis of the method lies in that human eyes have a higher preference for a high-chroma color. A specific manifestation is as follows. When chroma and lightness mapping is performed using the SGCK algorithm, a mapping end point is a lightness point corresponding to a maximum chroma value (a CUSP point) of a target color gamut. However, it is found in research that chroma is not a very good color appearance indicator, an ordinary person without professional training cannot well perceive the chroma, and a difference between an actual experimental result and a theoretical prediction result is comparatively large. The method is not based on an actual color perception attribute of human eyes, and lacks a theoretical basis. After mapping is performed, a user's perception and experience of an image color are comparatively poor.

Figure 3:
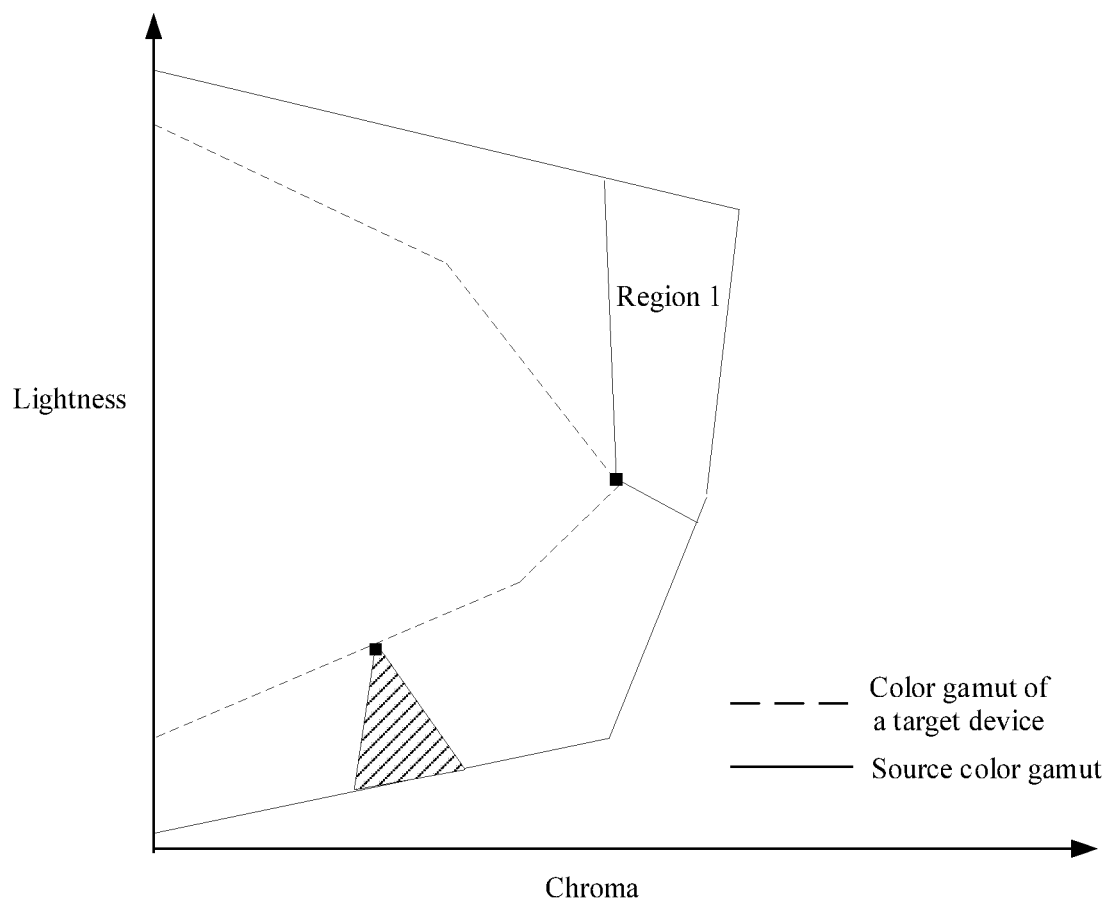
FIG. 3 is a schematic diagram of a hue-angle preserving minimum colour difference (HPMINDE) algorithm.

The other common color GCA is a HPMINDE algorithm. A basic principle is shown in FIG. 3. A region encircled by dashed lines and a lightness axis in FIG. 3 is a corresponding color gamut of a target device on a constant-hue plane of a color appearance space, and a triangular region encircled by solid lines and the lightness axis is a corresponding color gamut of a source image. A color that is in the source image and that falls within the color gamut of the target device is the same as a corresponding color in the color gamut of the target device. A color beyond a boundary of the color gamut of the target device is mapped, on the constant-hue plane of the color appearance space, to a point that is on a boundary line of the color gamut of the target device and that has a smallest color difference from a color point in the source image. For example, as shown in FIG. 3, a color in a region 1 or a shadow region beyond the color gamut of the target device is mapped, using the HPMINDE algorithm, to a point (a point marked by a black square in FIG. 3) that is on the boundary line of the color gamut of the target device and that is closest to the region.

Because the HPMINDE algorithm maps all colors beyond the color gamut of the target device onto the boundary of the color gamut of the target device, different color points in the source image may be mapped to a same point on the boundary of the color gamut of the target device. Details of the source image are lost, causing blurring or haloing on a mapped image, and affecting user experience.

It can be learned that a main problem of the current color gamut mapping method is that calculation is comparatively complex, a calculation speed is comparatively low, and a requirement for a processing capability of a device is comparatively high. In addition, an effect of a processed image is not quite good. A user's perception and experience of an image color are comparatively poor, some details of a source image may be lost, and so on. This affects user experience and development of industries such as textiles, printing, computer-aided designs, e-commerce, and telemedicine.

In addition, because a wide color gamut display (a display device that can display a comparatively wide color gamut range) is not popularized before, most color gamut mapping algorithms are specific to researches on a mapping from a color gamut of a display to a color gamut of a printer (that is, from a device displaying a wider color gamut range to a device displaying a narrower color gamut range), and focus on color gamut compression, that is, a mapping from a wider color gamut to a narrower color gamut. However, with popularization of the wide color gamut display, a current demand for a color gamut extension algorithm (GEA) (a mapping from a narrower color gamut to a wider color gamut) is more urgent. However, currently, no color GEA is available.

Based on the foregoing problems, this application provides a color gamut mapping method, to reduce calculation complexity of mapping, ensure quality of an image obtained by mapping a source image to a color gamut of a target device, and prevent a problem such as blurring of details of the image mapped to the target device. In this way, the image obtained through color gamut mapping is closer to the source image. In addition, an image may be mapped from a device with a narrower color gamut to a device with a wider color gamut using the color gamut mapping method in this application, thereby improving user experience.

The following briefly describes a typical application scenario of the color gamut mapping method provided in this application.

Figure 4:
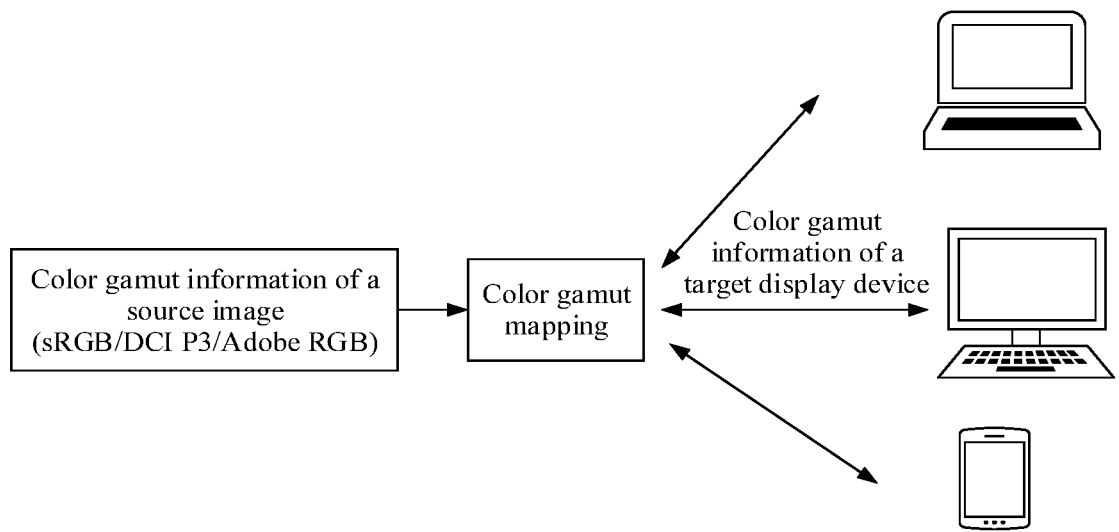
FIG. 4 is a schematic diagram of an application scenario according to an embodiment of this application.

The color gamut mapping method provided in this application may be applied to a process of transferring an image from a source device to a target device for display, and may be applied to a display device with any color gamut such that content sourcing from a plurality of color gamuts can be correctly displayed and transferred. FIG. 4 is a schematic diagram of an application scenario according to an embodiment of this application. Color gamut information (a source color gamut) of a source image on a source device is finally displayed on different target display devices after undergoing color gamut mapping. Currently, a popular image color gamut is mainly standard RGB (sRGB). In addition, an ADOBE RGB color gamut, an APPLE wide color gamut (Display P3, DCI-P3) image, and a high dynamic range (HDR) color gamut such as a BT2020 color gamut are also available. Ranges (for example, chroma and lightness ranges) of different types of color gamuts are different. In FIG. 4, a color gamut of a source image may be sRGB, DCI-P3, Adobe RGB, or the like, and a color gamut of a target display device may be DCI-P3, BT2020, or the like. The color gamut mapping method in this application may be applied to mutual conversion of a color gamut of an image between sRGB and DCI-P3 and between DCI-P3 and BT2020. It should be understood that, in addition to the foregoing several types of color gamuts, the color gamut mapping method provided in the embodiments of this application may be further applied to a process of mutual conversion between other different types of color gamuts. This is not limited in this embodiment of this application.

Figure 5:
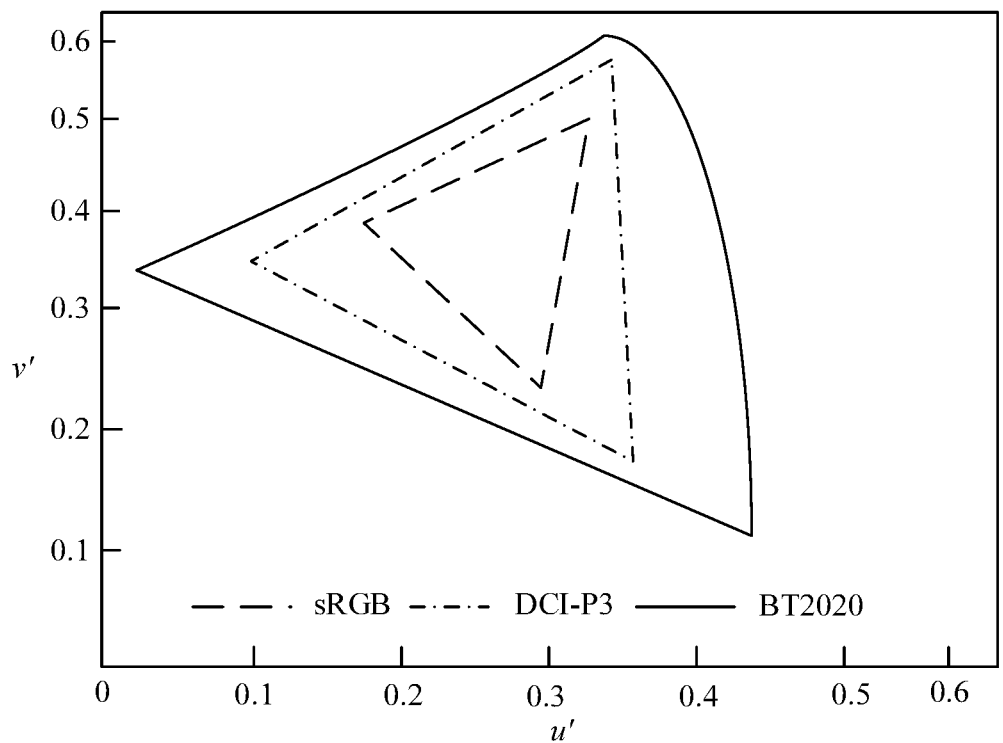
FIG. 5 is a schematic diagram of three typical color gamut ranges according to an embodiment of this application.

FIG. 5 is a schematic diagram of three typical color gamut ranges according to an embodiment of this application. For color gamuts of any two displays, relative sizes of ranges of the color gamuts may be determined with reference to a relative size of a triangle encircled by three RGB channels of the two displays on a CIE1964 u', v' chroma graph. As shown in FIG. 5, a triangle of an sRGB color gamut is completely encircled by a triangle of a DCI-P3 color gamut, and the triangle of the DCI-P3 color gamut is completely encircled by a triangle of a BT2020 color gamut. When an image is transferred between display devices with different color gamuts, the color gamut mapping method provided in the embodiments of this application may be applied.

It should be understood that, in addition to a display scenario shown in FIG. 4 in which an image is transferred between different devices, the color gamut mapping method provided in this application may be further applied to another scenario, for example, an image transfer process in a printing process, or a scenario in which a video is transferred between different devices for display. This is not limited in this embodiment of this application.

Figure 6:
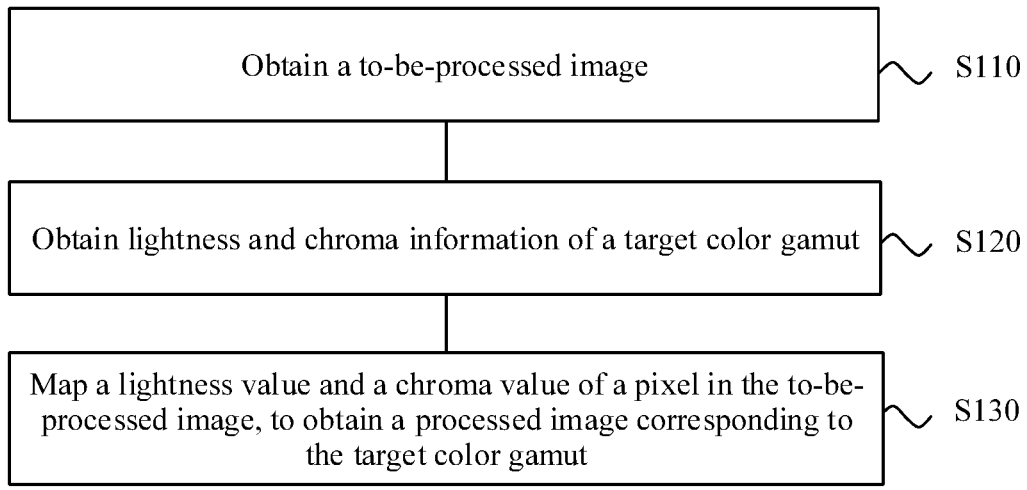
FIG. 6 is a schematic flowchart of a color gamut mapping method according to an embodiment of this application.

The following describes in detail the color gamut mapping method provided in the embodiments of this application with reference to FIG. 6. As shown in FIG. 6, the method 100 includes the following steps.

S110. Obtain a to-be-processed image.

S120. Obtain lightness and chroma information of a target color gamut.

S130. Map a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

Further, in a conventional color appearance model, color appearance perception attributes of an object are classified into lightness, a hue angle, and chroma. However, in an existing color gamut mapping method, mapping is performed in a direction towards a high-chroma color. To be specific, a mapping end point is a lightness point corresponding to a maximum chroma value (a CUSP point) of a color gamut of a target device. However, it is found in a research that chroma is not a very good color appearance indicator, an ordinary person without professional training cannot well perceive the chroma, and a difference between an actual experimental result and a theoretical prediction result is comparatively large. Therefore, Berns proposes a new color appearance perception factor: a vividness indicator. The vividness indicator can better represent a color perception of human eyes, and an experiment has proved that the vividness indicator can well reflect actual color experience of human eyes. Vividness is defined as a distance from any color point in a color gamut to a black point (a pixel with minimum lightness in the color gamut). This can minimize a change of vividness, maximally ensure a comparatively constant color perception of human eyes, and ensure that a color change on a connection line between the color point and the black point is minimized.

According to the color gamut mapping method provided in this application, in a process of transferring the to-be-processed image (a source image) to the target color gamut for display, color gamut mapping may be performed based on vividness and the lightness and chroma information of the target color gamut. To be specific, lightness values and chroma values of all pixels in the color gamut of the to-be-processed image are mapped to the point with the minimum lightness (the mapping end point) in the target color gamut. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, where the mapping end point indicates a mapping direction and a mapping distance, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

Figure 7:
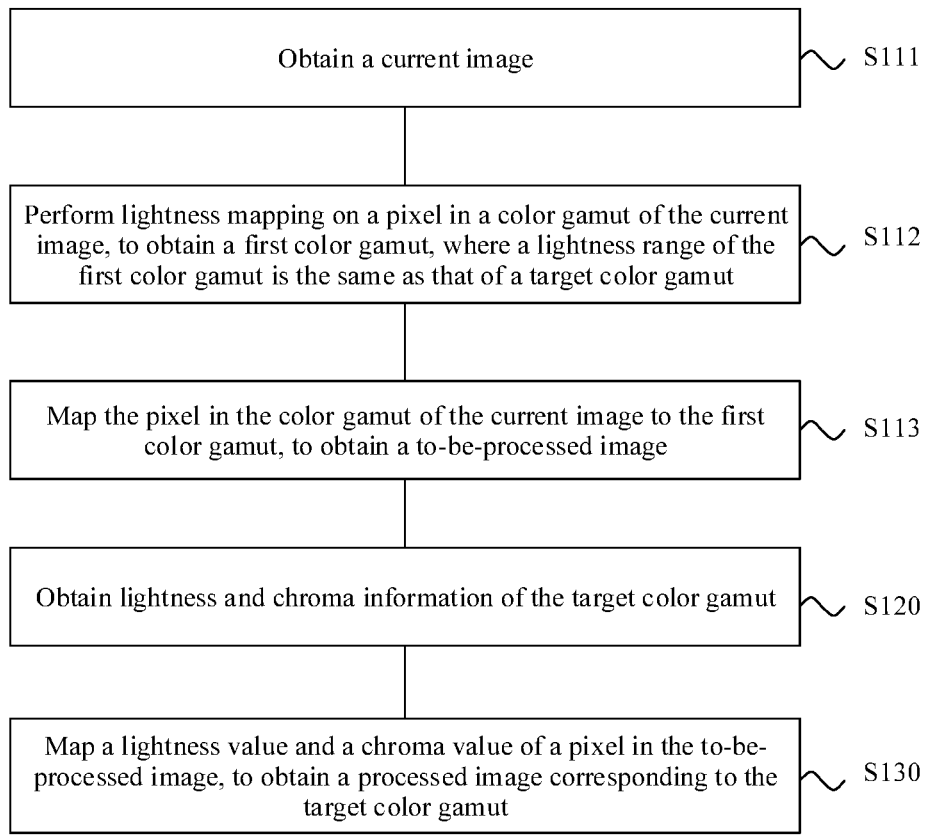
FIG. 7 is a schematic flowchart of a color gamut mapping method according to another embodiment of this application.

Optionally, in an embodiment, as shown in FIG. 7, obtaining a to-be-processed image in S110 includes the following steps.

S111. Obtain a current image.

S112. Perform lightness mapping on a pixel in a color gamut of the current image, to obtain a first color gamut, where a lightness range of the first color gamut is the same as that of the target color gamut.

S113. Map the pixel in the color gamut of the current image to the first color gamut, to obtain the to-be-processed image.

Further, the current image is obtained before the to-be-processed image is obtained. A color gamut range of the current image may be different from or the same as a range of the target color gamut. When the color gamut range of the current image is the same as the range of the target color gamut, the current image is the to-be-processed image. When the color gamut range of the current image is different from the range of the target color gamut, the current image needs to be mapped to obtain the to-be-processed image. Herein, that color gamut ranges are different may be understood as that at least one of a maximum value and a minimum value of a color gamut range is different from that of another color gamut range. For example, that chroma ranges are different may be understood as that a maximum chroma value of the color gamut of the to-be-processed image is different from that of the target color gamut, and/or a minimum chroma value of the color gamut of the current image is different from that of the target color gamut. Alternatively, lightness ranges are different, or both chroma and lightness ranges are different. That lightness ranges are different is used as an example for description. It is assumed that a lightness range of the color gamut of the current image is 20-80, and a lightness range of the target color gamut is 30-60. It can be learned that the lightness range of the color gamut of the current image completely includes the lightness range of the target color gamut. This is a case in which lightness ranges are different. Alternatively, a lightness range of the current image is 20-80, and a lightness range of the target color gamut is 50-90. It can be learned that the lightness range of the color gamut of the current image partially overlaps the lightness range of the target color gamut. This is another case in which lightness ranges are different. Alternatively, a lightness range of the current image is 20-80, and a lightness range of the target color gamut is 20-90. It can be learned that a minimum value in the lightness range is the same as that in the lightness range of the target device in this case. This is still another case in which lightness ranges are different. When the lightness range of the color gamut of the current image is different from that of the target color gamut, because the lightness ranges are different, if the lightness ranges are not adjusted, a lightness change of the color gamut of the current image is excessively large in a process of performing color gamut mapping (color and lightness mapping) to the point with the minimum lightness in the target color gamut. As a result, a calculation amount in the mapping process increases, mapping accuracy and precision are reduced, and quality of the processed image finally obtained is affected.

Figure 8:
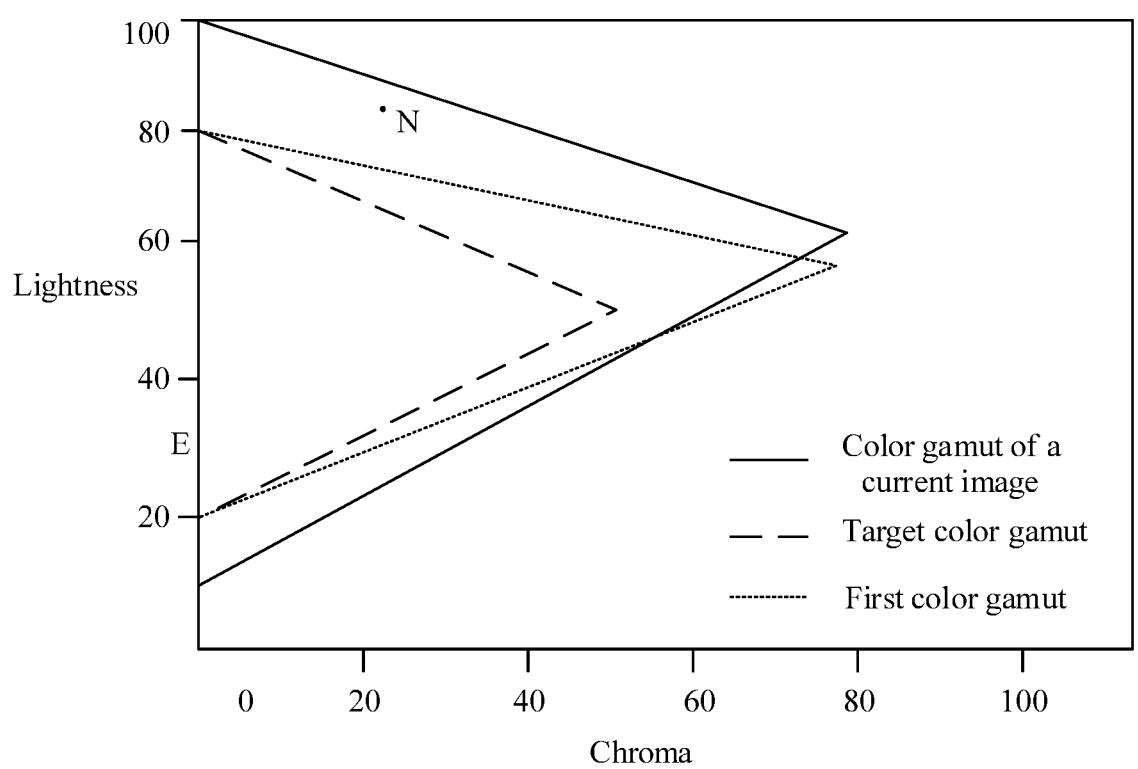
FIG. 8 is a schematic diagram in which a lightness range of a color gamut of a to-be-processed image is different from that of a color gamut of the target device according to an embodiment of this application.

Therefore, before color gamut mapping is performed from the color gamut of the current image to the point with the minimum lightness in the color gamut of the target device, the current image is obtained in S111. In S112, lightness mapping is performed on the pixel in the color gamut of the current image, to obtain the first color gamut, where the lightness range of the first color gamut is the same as that of the target color gamut. Optionally, lightness mapping may be first performed on a pixel on a boundary of the color gamut of the current image, to obtain the first color gamut, where the lightness range of the first color gamut is the same as that of the target color gamut. A purpose of performing lightness mapping only on the pixel on the boundary of the color gamut of the current image is to determine a boundary location of the first color gamut, that is, to first determine an intermediate color gamut region, which is the first color gamut, where the lightness range of the first color gamut is the same as that of the color gamut of the target device. The first color gamut may be referred to as a lightness mapped gamut (LMG). FIG. 8 is a schematic diagram in which the lightness range of the color gamut of the current image is different from that of the color gamut of the target device according to an embodiment of this application. A region indicated by dotted lines in FIG. 8 is the first color gamut, and the lightness range of the first color gamut is the same as that of the target color gamut. In S113, the pixel in the color gamut of the current image is mapped to the first color gamut, to obtain the to-be-processed image. Because only a range of the first color gamut is determined in S112, some pixels in the color gamut of the current image may be located beyond the range of the region of the first color gamut. For example, lightness and/or chroma are/is beyond the lightness range and a chroma range of the first color gamut. For example, a pixel N in FIG. 8 is beyond the range of the first color gamut. Therefore, pixels in the color gamut of the current image (all pixels in the color gamut of the current image) need to be mapped to the first color gamut. That is, the pixels in the color gamut of the current image are mapped to the first color gamut, to obtain the to-be-processed image.

According to the color gamut mapping method provided in this application, when the lightness range of the color gamut of the current image is different from that of the target color gamut, the color gamut of the current image is first mapped to the first color gamut that has a same lightness range as that of the target color gamut, then the pixel in the color gamut of the current image is mapped to the first color gamut, and finally, a pixel in the first color gamut is mapped to the point with the minimum lightness in the target color gamut, to obtain the to-be-processed image. This avoids a problem that an excessively large lightness change of a to-be-processed color gamut in a color gamut mapping process due to a difference between a lightness range of the color gamut of the to-be-processed image and the lightness range of the target color gamut increases a calculation amount and reduces mapping accuracy and precision in a vividness-based color gamut mapping process. This can improve a speed and accuracy of color gamut mapping, and further improve user experience.

It should be understood that when the lightness range of the color gamut of the current image is different from that of the target color gamut, alternatively, color gamut mapping may be directly performed on the pixel in the color gamut of the current image based on vividness, without the lightness make-up step. This is not limited in this embodiment of this application.

It should be further understood that, in this embodiment of this application, shapes of the color gamut of the current image, the color gamut of the to-be-processed image, and the color gamut of the target device are not limited. In addition to the foregoing triangles, the color gamut of the current image, the color gamut of the to-be-processed image, and the color gamut of the target device may be alternatively of other shapes. This is not limited in this embodiment of this application.

Optionally, when the lightness range of the color gamut of the current image is the same as that of the target color gamut, the pixel in the color gamut of the current image may be directly mapped to the point with the minimum lightness in the target color gamut.

Optionally, in an embodiment, in a process of performing lightness mapping on the pixel in the color gamut of the current image in S112, chroma of the pixel in the color gamut of the current image remains unchanged.

Further, in S112, lightness mapping is first performed on the pixel in the color gamut of the current image, to obtain the first color gamut, where the lightness range of the first color gamut is the same as that of the target color gamut. In the process of performing lightness mapping, the chroma of the pixel in the color gamut of the current image remains unchanged. In the process of performing lightness mapping on the pixel in the color gamut of the current image, the chroma of the pixel in the color gamut of the current image remains unchanged, to avoid a problem that simultaneous changes of the chroma and the lightness cause a comparatively large change of the color gamut of the to-be-processed image, and possibly cause low precision of a location of the first color gamut. This can reduce a calculation amount in a process of performing lightness mapping on a pixel on a boundary of the color gamut of the current image, reduce calculation complexity, and improve accuracy of the first color gamut.

It should be understood that chroma of the pixel on the boundary of the color gamut of the current image may also change in the process of performing lightness mapping on the pixel on the boundary of the color gamut of the current image. This is not limited in this embodiment of this application.

Figure 9:
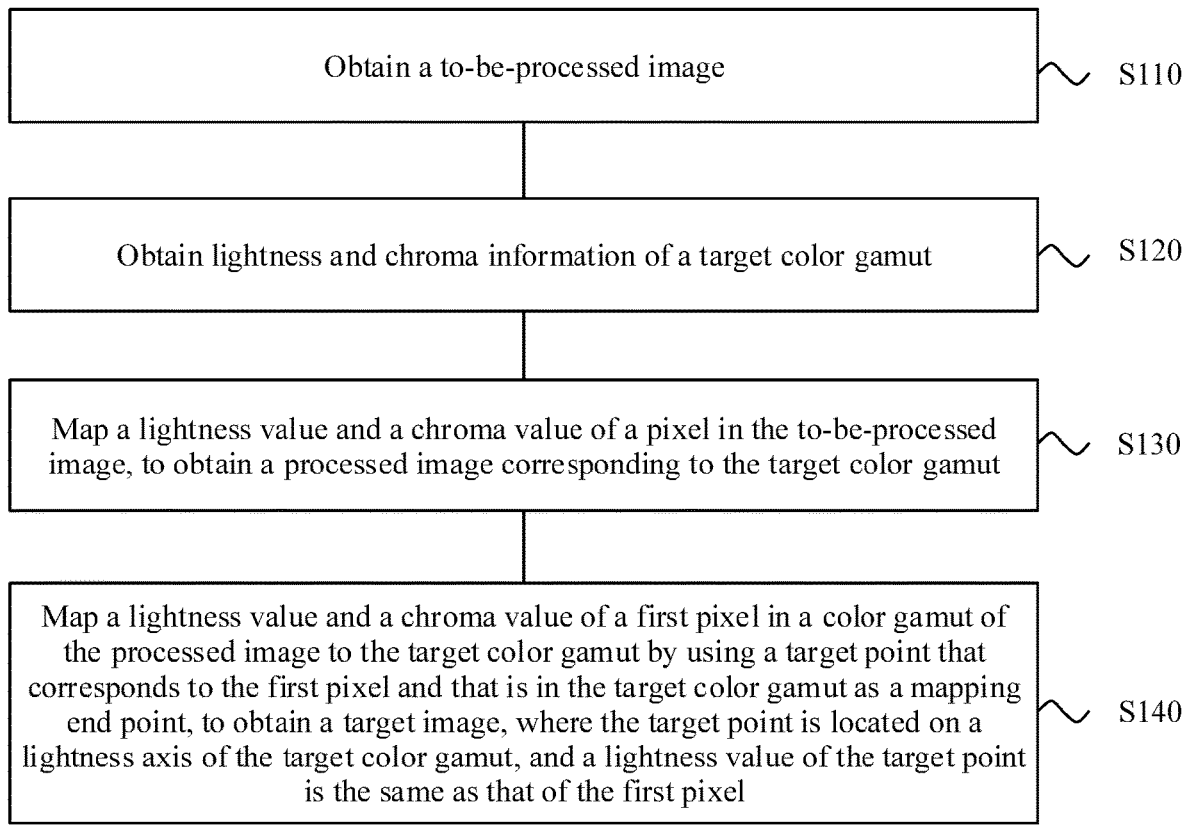
FIG. 9 is a schematic flowchart of a color gamut mapping method according to another embodiment of this application.

Optionally, in an embodiment, as shown in FIG. 9, the method 100 further includes the following step.

S140. Map a lightness value and a chroma value of a first pixel in a color gamut of the processed image to the target color gamut using a target point that corresponds to the first pixel and that is in the target color gamut as a mapping end point, to obtain a target image, where the target point is located on a lightness axis of the target color gamut, and a lightness value of the target point is the same as that of the first pixel.

Further, after the lightness value and the chroma value of the pixel in the to-be-processed image are mapped to obtain the processed image corresponding to the target color gamut, the lightness value and the chroma value of the first pixel in the color gamut of the processed image further need to be mapped to the target color gamut using the target point corresponding to any pixel (the first pixel) in the target color gamut as the mapping end point, to obtain the target image. Optionally, the first pixel may be a pixel that is in the color gamut of the processed image and that is beyond a range of the target color gamut, for example, a chroma color gamut range and/or a lightness color gamut range. For example, chroma of the first pixel is greater than a maximum chroma value of the target color gamut, or chroma of the first pixel is less than a minimum chroma value of the target color gamut. In a process of mapping the first pixel to the target color gamut, the first pixel is mapped to the target color gamut using the target point that corresponds to the first pixel and that is in the target color gamut as the mapping end point, to obtain the target image. To be specific, the mapping end point in the mapping process is the target point whose chroma is 0 and whose lightness is equal to the lightness value corresponding to the first pixel. That is, lightness remains unchanged in the mapping process.

The target image is finally obtained by ensuring that the chroma and the lightness of the first pixel are within the chroma range and the lightness range of the target color gamut respectively such that the color gamut of the to-be-processed image finally completely falls within the range of the target color gamut. This improves precision and efficiency of color gamut mapping, and ensures quality of an image obtained by mapping the to-be-processed image to the target color gamut such that the image obtained through color gamut mapping is closer to the original image, thereby improving user experience.

Optionally, in an embodiment, mapping a lightness value and a chroma value of a pixel in the to-be-processed image, to obtain a processed image corresponding to the target color gamut in S130 includes mapping the lightness value and the chroma value of the pixel in the to-be-processed image based on the following formula (7), to obtain the processed image corresponding to the target color gamut:

$$\overrightarrow{EP'} = \begin{cases} \overrightarrow{EP}; EP \leq k * \overline{EP_d} \\ k * \overline{EP_d} + \dfrac{\overline{EP} - k * \overline{EP_d}}{\overline{EP_s} - k * \overline{EP_d}} * (1-k) * \overline{EP_d}; EP > k * \overline{EP_d} \end{cases} \quad (7)$$

In the formula (7), E is the mapping end point, lightness of the point E is the minimum lightness value of the color gamut of the target device, chroma of the point E is 0, P is any pixel in the color gamut of the to-be-processed image or any pixel in the first color gamut, $\overline{EP}$ is a distance between P and E, $P_d$ is an intersection point between $\overline{EP}$ and a boundary of the color gamut of the target device, $\overline{EP_d}$ is a distance between E and $P_d$, $P_s$ is an intersection point between an extension line of $\overline{EP}$ and a boundary of the color gamut of the to-be-processed image or a boundary of the first color gamut, $\overline{EP_s}$ is a distance between E and $P_s$, P' is a point that is in the processed image corresponding to the target color gamut and that is obtained by mapping P using the foregoing formula, $\overline{EP'}$ is a distance between E and P', and k is a coefficient with a value range of 0.7≤k≤0.95.

Figure 10:
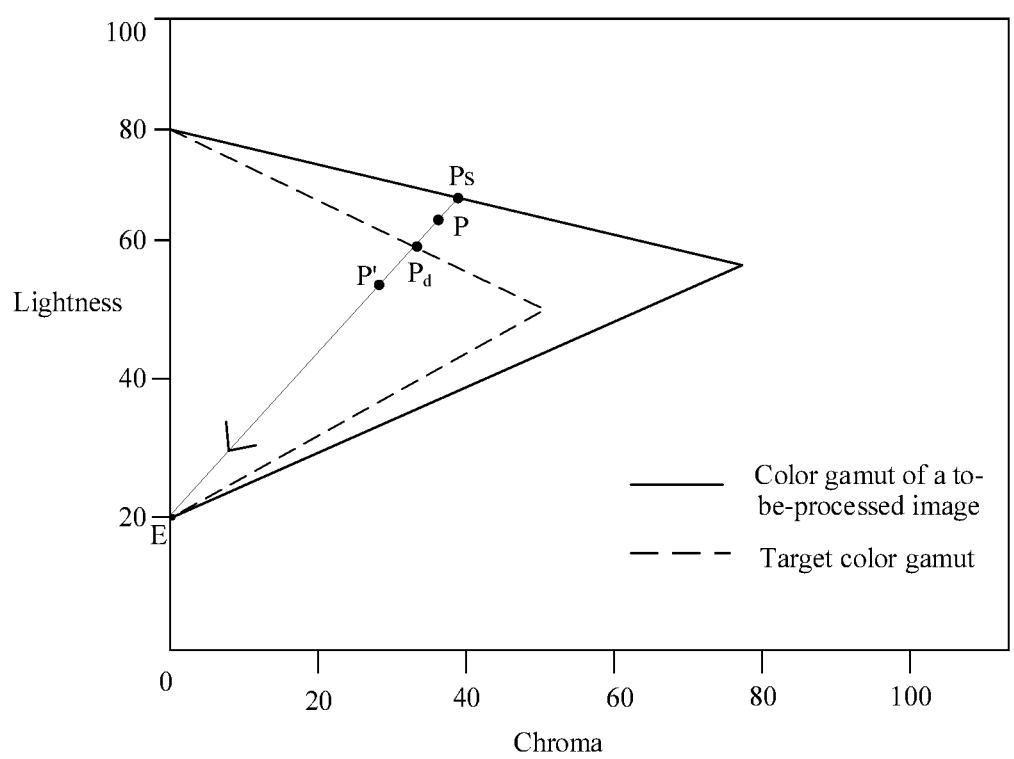
FIG. 10 is a schematic diagram of performing mapping to a point with minimum lightness in a color gamut of a target device according to an embodiment of this application.
Figure 11:
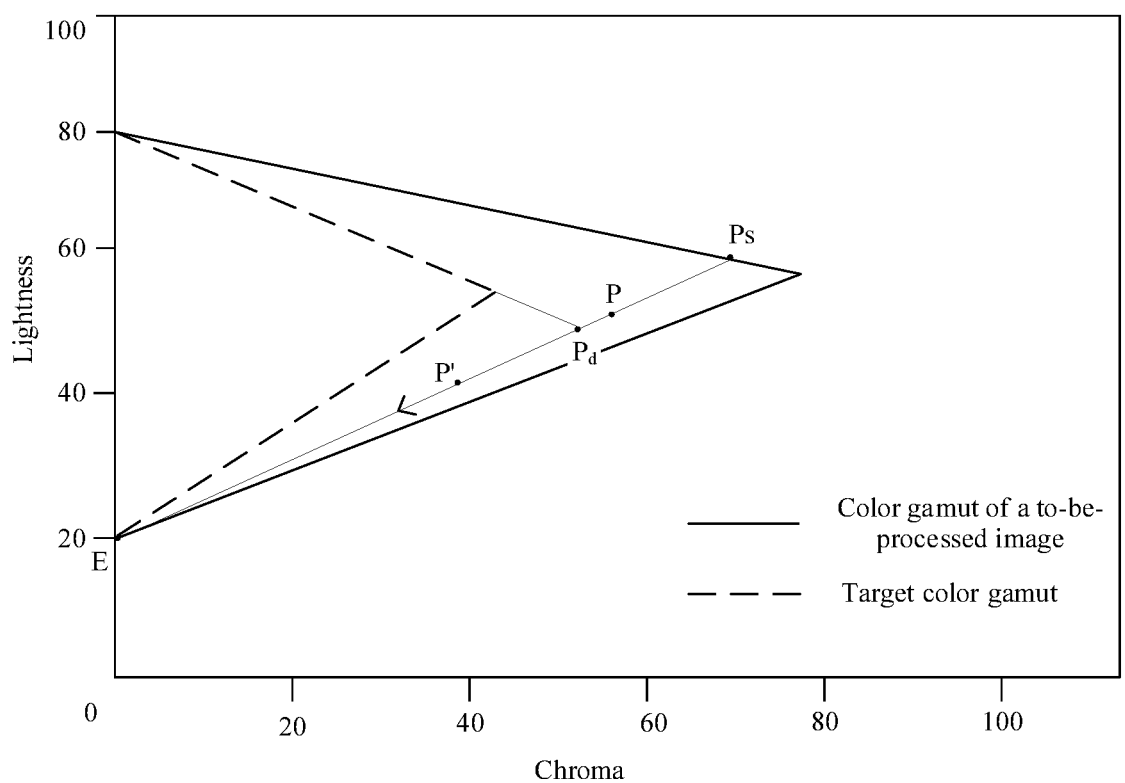
FIG. 11 is a schematic diagram of performing mapping to a point with minimum lightness in a color gamut of a target device according to another embodiment of this application.

Further, FIG. 10 is a schematic diagram of performing mapping to the point with the minimum lightness in the target color gamut according to an embodiment of this application. In FIG. 10, a region encircled by solid lines is the color gamut of the to-be-processed image (a source color gamut), and a region encircled by dashed lines is the target color gamut. E is the mapping end point, lightness of the point E is the minimum lightness value of the target color gamut, and chroma of the point E is 0. P is any pixel in the color gamut of the to-be-processed image. $\overline{EP}$ is a distance between P and E. $P_d$ is an intersection point between $\overline{EP}$ and a boundary of the target color gamut. When there is no intersection point between $\overline{EP}$ and the boundary of the target color gamut, as shown in FIG. 11, a connection line between a point with maximum lightness and a point with maximum chroma in the target color gamut is extended until the connection line intersects with $\overline{EP}$ or an extension line of $\overline{EP}$, and an intersection point is $P_d$. A line segment $\overline{EP_d}$ is a distance between E and $P_d$, $P_s$ is an intersection point between an extension line of $\overline{EP}$ and a boundary of the color gamut of the to-be-processed image, $\overline{EP_s}$ is a distance between E and $P_s$, P' is a point obtained by mapping P using the foregoing formula, $\overline{EP'}$ is a distance between E and P', and k is a coefficient with a value range of 0.7≤k≤0.95. After mapping is performed using the formula (7), P' is obtained by performing color gamut mapping on the point P based on vividness. That is, color gamut information of P' is a point that is in the processed image corresponding to the target color gamut and that is obtained by mapping the point P.

A meaning of the formula (7) is as follows. If the pixel P in the color gamut of the to-be-processed image is within k times the range of the target color gamut, for example, a value of k is 0.9, that is, if the pixel P in the color gamut of the to-be-processed image is within 90% of the range of the target color gamut, that is, $\overline{EP}$≤0.9*$\overline{EP_d}$, a color obtained by performing color gamut mapping on the pixel P is the same as a color shown before the pixel P undergoes color gamut mapping. However, if the pixel P in the color gamut of the to-be-processed image is beyond 90% of the range of the target color gamut, that is, $\overline{EP}$>0.9*$\overline{EP_d}$, the pixel P is transformed into 10%, close to a boundary, of the range of the target color gamut using the linear compression formula (7), to complete color gamut mapping transformation.

Figure 12:
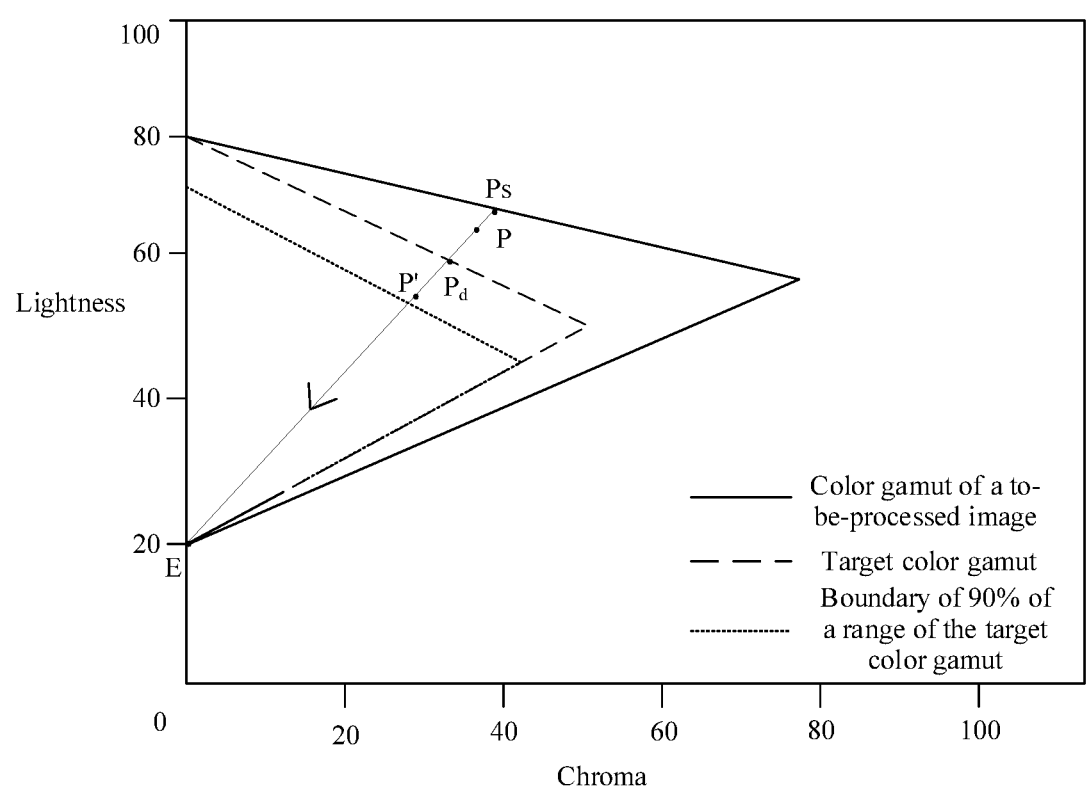
FIG. 12 is a schematic diagram of mapping a pixel in a color gamut of a to-be-processed image to a point with minimum lightness in a color gamut of the target device according to an embodiment of this application.

For example, FIG. 12 is a schematic diagram of mapping the pixel in the color gamut of the to-be-processed image to the point with the minimum lightness in the target color gamut according to an embodiment of this application. For example, a value of k is 0.9, E is the mapping end point, lightness of the point E is the minimum lightness value of the target color gamut, and chroma of the point E is 0. Dotted lines are boundary lines of 90% of the range of the target color gamut. Other two boundaries (a boundary on a lightness axis and a boundary between the maximum chroma value and the point E) of 90% of the range of the color gamut of the target device partially overlap corresponding boundaries of the color gamut of the target device. When P is within 90% of the range of the target color gamut, $\overline{EP}$≤0.9*$\overline{EP_d}$ is met, that is, P is located in a region encircled by the dotted lines. Color gamut information obtained by mapping the point P is the same as color gamut information shown before the point P is mapped. When P is beyond 90% of the range of the target color gamut, that is, $\overline{EP}$>0.9*$\overline{EP_d}$, the point P is beyond the region encircled by the dotted lines. In this case, chroma and lightness need to be mapped based on the foregoing formula, to finally obtain color gamut information for displaying the to-be-processed image in the target color gamut. The point P in FIG. 12 is beyond 90% of the range of the target color gamut. Therefore, mapping needs to be performed based on the foregoing formula, to obtain color gamut information for displaying the point P in the target color gamut.

According to the color gamut mapping method provided in this application, color gamut mapping is performed based on vividness and using the formula (7). To be specific, lightness and chroma mapping is performed from the pixel in the color gamut of the to-be-processed image to the point with the minimum lightness in the color gamut of the target device based on the formula (7). This can improve accuracy of color gamut mapping, improve calculation efficiency, implement mapping from a single color to another single color, prevent blurring of details, and the like. Mapping complexity is reduced. Calculation costs of color gamut mapping are reduced such that a mapped image is brighter. This improves a user's perception of a color obtained by mapping the to-be-processed image, and improves user experience.

It should be understood that, in this embodiment of this application, in addition to the formula (7) used for color gamut mapping based on vividness, another formula or any other possible variant formula of the formula (7) may be used for color gamut mapping. This is not limited in this embodiment of this application.

Optionally, in an embodiment, performing lightness mapping on a pixel in a color gamut of the current image, to obtain a first color gamut in S121 includes performing lightness mapping on the pixel in the color gamut of the current image based on the following formula (8), to obtain the first color gamut:

$$L'_C = \frac{L_C - \min(L_o)}{\max(L_o) - \min(L_o)} * (\max(L_r) - \min(L_r)) + \min(L_r). \quad (8)$$

In the formula (8), C is any pixel in the color gamut of the to-be-processed image, $L_C$ is lightness of the pixel C, $\min(L_o)$ is a minimum lightness value of the color gamut of the current image, $\max(L_o)$ is a maximum lightness value of the color gamut of the current image, $\min(L_r)$ is the minimum lightness value of the target color gamut, $\max(L_r)$ is a maximum lightness value of the target color gamut, C' is a point obtained by mapping C using the foregoing formula, and $L_C'$ is lightness of C'.

Further, when the lightness range of the color gamut of the current image is different from that of the target color gamut, lightness mapping needs to be first performed on a pixel on a boundary of the color gamut of the current image, to obtain the first color gamut, where the lightness range of the first color gamut is the same as that of the color gamut of the target device. That is, the boundary of the first color gamut may be determined using the formula (8).

Figure 13:
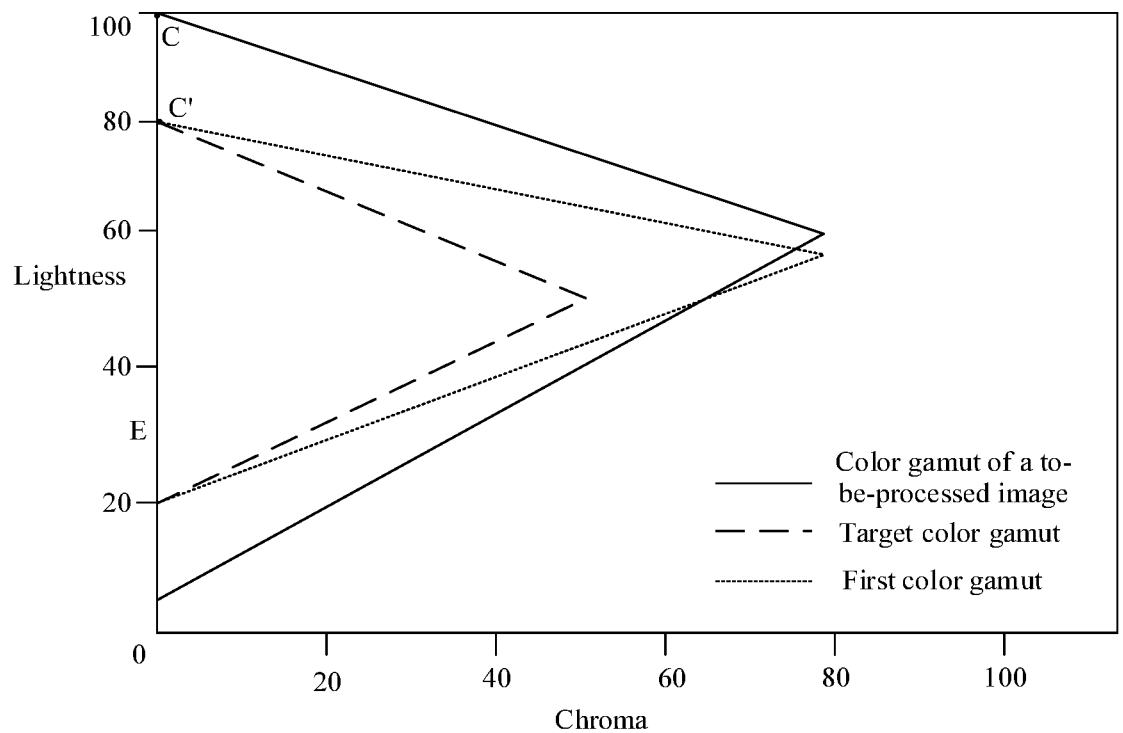
FIG. 13 is a schematic diagram of performing lightness mapping on a pixel on a boundary of a color gamut of a to-be-processed image to obtain a first color gamut according to an embodiment of this application.

For example, FIG. 13 is a schematic diagram of performing lightness mapping on the pixel in the color gamut of the current image to obtain the first color gamut according to an embodiment of this application. In FIG. 13, the pixel C on the boundary of the color gamut of the current image is used as an example for description. $L_C$ is lightness of the pixel C, a value of $L_C$ is 100, a chroma value of the point C is 0, $\min(L_o)$ is a minimum lightness value of the color gamut of the current image, a value of $\min(L_o)$ is 4, $\max(L_o)$ is a maximum lightness value of the color gamut of the current image, a value of $\max(L_o)$ is 100, $\min(L_r)$ is the minimum lightness value of the target color gamut, a value of $\min(L_r)$ is 20, $\max(L_r)$ is a maximum lightness value of the target color gamut, and a value of $\max(L_r)$ is 80. The foregoing values are substituted into the formula (8), to obtain lightness $L_C'$: 80, that is, it is learned that a point C' obtained by performing lightness mapping on the point C is a pixel whose lightness is 80. When there may be a plurality of pixels whose lightness is 80, because chroma of the point C remains unchanged after the point C undergoes lightness mapping, lightness of C' is 80, and chroma of C' is 0.

According to the color gamut mapping method provided in this application, lightness mapping is performed on the pixel in the color gamut of the current image using the formula (8), to obtain the first color gamut. This can improve accuracy for obtaining the first color gamut, improve calculation efficiency, and reduce calculation complexity. Calculation costs of color gamut mapping are reduced, thereby facilitating implementation.

It should be understood that, in this embodiment of this application, in addition to the formula (8) used for performing lightness mapping on the pixel in the color gamut of the current image to obtain the first color gamut, another formula or any other possible variant formula of the formula (8) may be used for calculating the first color gamut. This is not limited in this embodiment of this application.

Optionally, in an embodiment, the mapping the pixel in the color gamut of the current image to the first color gamut, to obtain the to-be-processed image in S113 includes mapping the pixel in the color gamut of the current image to the first color gamut based on the following formula (9), to obtain the to-be-processed image:

$$\overline{MN'} = \begin{cases} \overline{MN}; \overline{MN} \le t * \overline{MS_1} \\ t * \overline{MS_1} + \dfrac{\overline{MN} - t * \overline{MS_1}}{\overline{MS_2} - t * \overline{MS_1}} * (1-t) * \overline{MS_1}; \overline{MN} > t * \overline{MS_1} \end{cases} \quad (9)$$

In the formula (9), M is the mapping end point, lightness of M is half of a sum of the minimum lightness value and the maximum lightness value of the color gamut of the current image, chroma of M is 0, N is any pixel in the color gamut of the current image, $\overline{MN}$ is a distance between the point M and the point N, $S_1$ is an intersection point between $\overline{MN}$ and a boundary of the first color gamut, $S_2$ is an intersection point between an extension line of $\overline{MN}$ and a boundary of the color gamut of the current image, $\overline{MS_1}$ is a distance between the point M and the point $S_1$, $\overline{MS_2}$ is a distance between the point M and the point $S_2$, N' is a point obtained by mapping N, $\overline{MN'}$ is a distance between the point M and N', and t is a coefficient with a value range of $0.7 \le t \le 0.95$.

Figure 14:
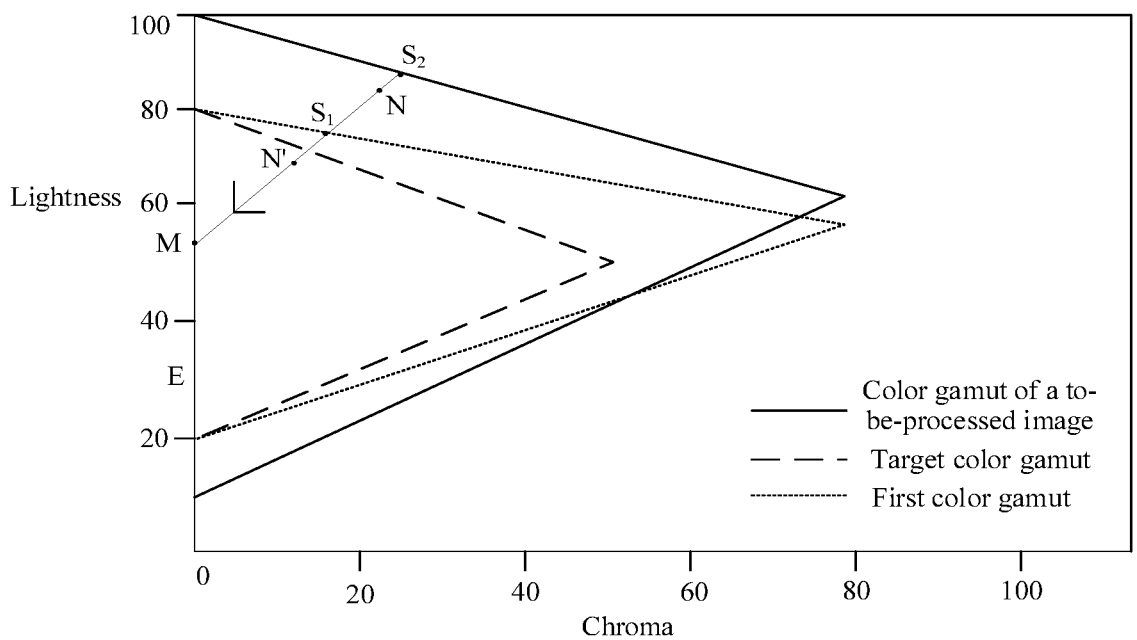
FIG. 14 is a schematic diagram of mapping a pixel in a color gamut of the to-be-processed image to a first color gamut according to an embodiment of this application.

Further, FIG. 14 is a schematic diagram of mapping the pixel in the color gamut of the current image to the first color gamut to obtain the to-be-processed image according to an embodiment of this application. In FIG. 14, a region encircled by dotted lines is the first color gamut, and a region encircled by solid lines is the color gamut of the current image. M is the mapping end point, lightness of M is half of a sum of the minimum lightness value and the maximum lightness value of the color gamut of the current image, chroma of M is 0, N is any pixel in the color gamut of the current image, $\overline{MN}$ is a distance between the point M and the point N, $S_1$ is an intersection point between $\overline{MN}$ and a boundary of the first color gamut, $S_2$ is an intersection point between an extension line of $\overline{MN}$ and a boundary of the color gamut of the current image, $\overline{MS_1}$ is a distance between the point M and the point $S_1$, $\overline{MS_2}$ is a distance between the point M and the point $S_2$, N' is a point obtained by mapping N, that is, a corresponding pixel that is in the first color gamut and that is finally obtained by mapping the point N, $\overline{MN'}$ is a distance between the point M and N', and t is a coefficient with a value range of $0.7 \le t \le 0.95$.

A meaning of the formula (9) is as follows. If the pixel N in the color gamut of the current image is within t times the range of the first color gamut, for example, a value of t is 0.8, that is, if the pixel N in the color gamut of the current image is within 80% of the range of the first color gamut, that is, $\overline{MN} \le 0.8 * \overline{MS_1}$, a color obtained by performing color gamut mapping on the pixel N is the same as a color shown before the pixel N undergoes color gamut mapping. However, if the pixel N in the color gamut of the current image is beyond 80% of the range of the first color gamut, that is, $\overline{MN} > 0.8 * \overline{MS_1}$, mapping is performed using the formula (9), to obtain the to-be-processed image. In this way, the pixel in the color gamut of the current image is mapped to the first color gamut.

According to the color gamut mapping method provided in this application, the pixel in the color gamut of the current image is mapped to the first color gamut using the formula (9). This can improve accuracy of color gamut mapping, improve calculation efficiency, and reduce complexity of color gamut mapping. Calculation costs of color gamut mapping are reduced, thereby facilitating implementation.

It should be understood that, in this embodiment of this application, in addition to the formula (9) used for mapping the pixel in the color gamut of the current image to the first color gamut, another formula or any other possible variant formula of the formula (9) may be used for color gamut mapping. This is not limited in this embodiment of this application.

Optionally, in an embodiment, the mapping a lightness value and a chroma value of a first pixel in a color gamut of the processed image to the target color gamut using a target point that corresponds to the first pixel and that is in the target color gamut as a mapping end point, to obtain a target image in S140 includes mapping the first pixel based on the following formula (10), to obtain the target image:

$$\overline{AZ'} = \begin{cases} \overline{AZ}; \overline{AZ} \le k * \overline{AX_1} \\ k * \overline{AX_1} + \dfrac{\overline{AZ} - k * \overline{AX_1}}{\overline{AX_2} - k * \overline{AX_1}} * (1-k) * \overline{AX_1}; \overline{AZ} > k * \overline{AX_1} \end{cases} \quad (10)$$

In the formula (10), A is the mapping end point, Z is the first pixel, lightness of the point A is the same as that of Z, chroma of the point A is 0, $\overline{AZ}$ is a distance between the point A and the point Z, $X_1$ is an intersection point between $\overline{AZ}$ and a boundary of the color gamut of the target device, $\overline{AX_1}$ is a distance between the point A and the point $X_1$, $X_2$ is an intersection point between an extension line of $\overline{AZ}$ and a boundary of the color gamut of the processed image, $\overline{AX_2}$ is a distance between the point A and the point $X_2$, Z' is a point obtained by mapping Z, $\overline{AZ'}$ is a distance between A and Z', and k is a coefficient with a value range of 0.7≤k≤0.95.

Figure 15:
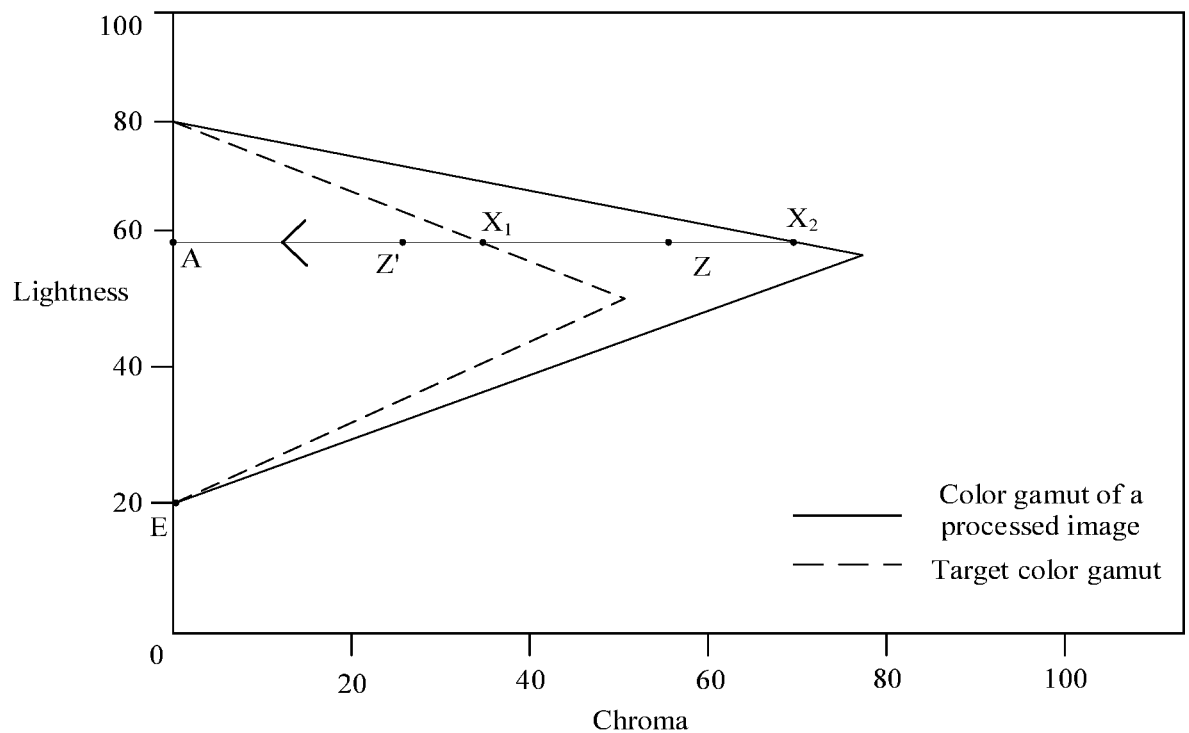
FIG. 15 is a schematic diagram of mapping a first pixel to a color gamut of a target device according to an embodiment of this application.

Further, in the obtained color gamut of the processed image, there may be some pixels whose chroma may be beyond the chroma range of the target color gamut, and these pixels may be first pixels. It should be understood that the first pixel may be any pixel in the color gamut of the processed image. For example, as shown in FIG. 15, A is the mapping end point, Z is the first pixel, chroma of the point Z is beyond the chroma range of the target color gamut, lightness of the point A is the same as that of Z, chroma of the point A is 0, $\overline{AZ}$ is a distance between the point A and the point Z, $X_1$ is an intersection point between $\overline{AZ}$ and a boundary of the target color gamut, $\overline{AX_1}$ is a distance between the point A and the point $X_1$, $X_2$ is an intersection point between an extension line of $\overline{AZ}$ and a boundary of the color gamut of the processed image, $\overline{AX_2}$ is a distance between the point A and the point $X_2$, Z' is a point obtained by mapping Z, to be specific, Z' is a corresponding pixel that is in the target image color gamut and that is finally obtained by mapping the point Z, $\overline{AZ'}$ is a distance between A and Z', and k is a coefficient with a value range of 0.7≤k≤0.95.

A meaning of the formula (10) is as follows. If the first pixel Z in the color gamut of the processed image is within k times the range of the target color gamut, for example, a value of k is 0.9, that is, if the first pixel Z in the color gamut of the processed image is within 90% of the range of the color gamut of the target device, that is, $\overline{AZ}$≤0.9*$\overline{AX_1}$, a color obtained by performing color gamut mapping on the first pixel Z is the same as a color shown before the first pixel Z undergoes color gamut mapping. However, if the first pixel Z in the color gamut of the processed image is beyond 90% of the range of the target color gamut, that is, $\overline{AZ}$>0.9*$\overline{AX_1}$, the first pixel Z is transformed into a range of the target color gamut using the formula (10). In this way, the pixel in the color gamut of the to-be-processed image is mapped to the first color gamut.

According to the color gamut mapping method provided in this application, the first pixel is mapped to the target color gamut using the formula (10). This can improve accuracy of color gamut mapping, improve calculation efficiency, and reduce complexity of color gamut mapping. Calculation costs of color gamut mapping are reduced, thereby facilitating implementation.

It should be understood that, in this embodiment of this application, in addition to the formula (10) used for mapping the first pixel to the target color gamut, another formula or any other possible variant formula of the formula (10) may be used for color gamut mapping. This is not limited in this embodiment of this application.

Optionally, in an embodiment, the lightness range of the target color gamut is within a lightness range of the color gamut of the to-be-processed image, and/or the chroma range of the target color gamut is within a chroma range of the color gamut of the to-be-processed image.

Further, in the foregoing embodiments of this application, a range of the color gamut of the to-be-processed image may include the range of the target color gamut. To be specific, the lightness range of the color gamut of the to-be-processed image includes the lightness range of the target color gamut, and the chroma range of the color gamut of the to-be-processed image includes the chroma range of the target color gamut, as shown in FIG. 8, and FIG. 10 to FIG. 14. That is, the foregoing color gamut mapping method may be used in a color gamut compression scenario, and the mapping method is a mapping method based on color gamut compression. The method may be used in a mapping process of performing transferring from a display device with a wider color gamut to a display device with a narrower color gamut. Alternatively, the range of the color gamut of the to-be-processed image may partially include the range of the target color gamut. To be specific, the lightness range of the color gamut of the to-be-processed image includes the lightness range of the target color gamut, and the chroma range of the color gamut of the to-be-processed image does not include (does not overlap or partially overlaps) the chroma range of the target color gamut, or the lightness range of the color gamut of the to-be-processed image does not include the lightness range of the target color gamut, and the chroma range of the color gamut of the to-be-processed image includes the chroma range of the target color gamut. That is, the color gamut mapping method provided in this embodiment of this application may also be used when the range of the target color gamut partially overlaps the range of the color gamut of the to-be-processed image.

In this embodiment of this application, the color gamut of the to-be-processed image may be DCI-P3, and the target color gamut may be sRGB, or the color gamut of the to-be-processed image may be BT2020, and the target color gamut may be DCI-P3, sRGB, or the like. This is not limited in this embodiment of this application.

It should be understood that, in this embodiment of this application, the color gamut of the to-be-processed image and the target color gamut may be alternatively another type of color gamut. This is not limited in this embodiment of this application.

It should be further understood that the color gamut mapping method provided in this application may also be used when the lightness range of the color gamut of the to-be-processed image is within the lightness range of the target color gamut, and/or the chroma range of the color gamut of the to-be-processed image is within the chroma range of the target color gamut. This is not limited in this embodiment of this application.

Optionally, the method further includes displaying the processed image or the target image.

Further, after the to-be-processed image is mapped, the processed image or the target image is obtained, and a terminal device may display the image to a user. For example, the to-be-processed image may be an image obtained by an image obtaining apparatus (for example, a camera) of a terminal device, and after the terminal device processes the image, a display screen of the terminal device may display the processed image or the target image to a user. Alternatively, the to-be-processed image may be an image displayed on a display screen of a terminal device, and another terminal device obtains the to-be-processed image, processes the image, and displays the processed image or the target image to a user.

Figure 16:
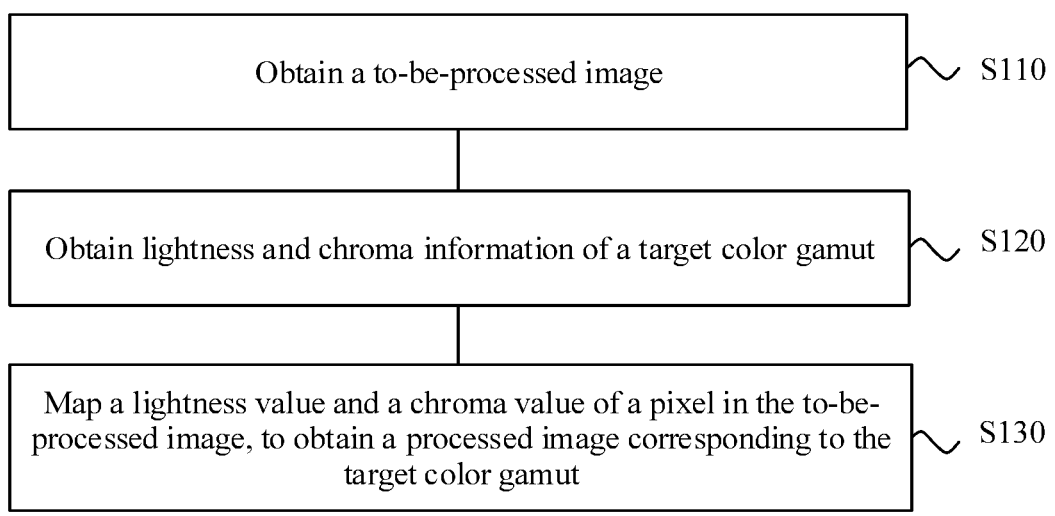
FIG. 16 is a schematic flowchart of a color gamut mapping method according to an embodiment of this application.

An embodiment of this application further provides a color gamut mapping method. In addition to a display scenario shown in FIG. 4 in which an image is transferred between different devices, the method may be further applied to another scenario, for example, an image transfer process in a printing process, or a scenario in which a video is transferred between different devices for display. As shown in FIG. 16, the method 200 includes the following steps.

S210. Obtain a to-be-processed image.

S220. Obtain lightness and chroma information of a target color gamut.

S230. Map a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

According to the color gamut mapping method provided in this application, in a process of transferring the to-be-processed image to the target color gamut for display, color gamut mapping may be performed based on vividness and the lightness and chroma information of the target color gamut. To be specific, lightness values and chroma values of all pixels in the color gamut of the to-be-processed image are mapped to the target color gamut using the point with the minimum lightness in the target color gamut as the mapping end point. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

Optionally, in an embodiment, the mapping a lightness value and a chroma value of a pixel in the to-be-processed image, to obtain a processed image corresponding to the target color gamut in S230 includes mapping a pixel G in the color gamut of the to-be-processed image to a point H, to obtain the processed image corresponding to the target color gamut, where H is an intersection point between $\overline{EG}$ and a boundary of the color gamut of the target device, H is the mapping end point, and E is the point with the minimum lightness in the color gamut of the target device.

Figure 17:
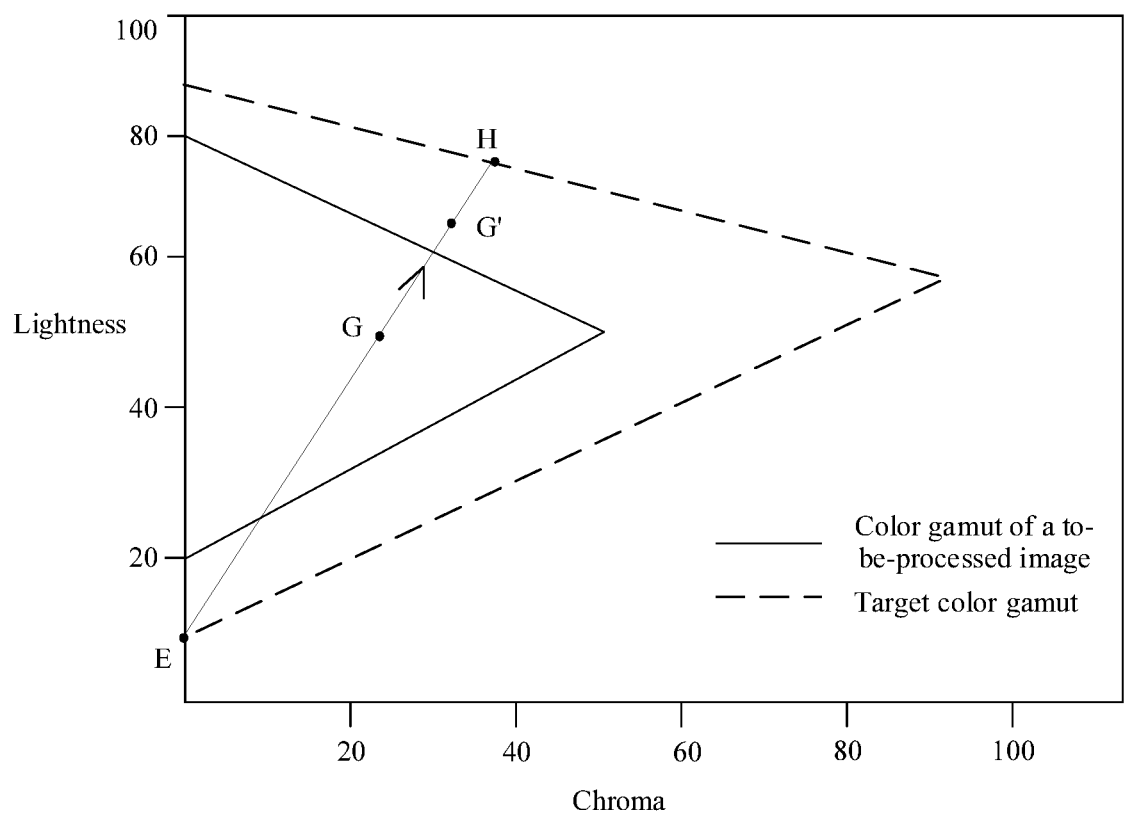
FIG. 17 is a schematic diagram of a color gamut mapping method according to an embodiment of this application.

Further, FIG. 17 is a schematic diagram of the color gamut mapping method according to an embodiment of this application. In FIG. 17, a region encircled by solid lines is the color gamut of the to-be-processed image (a source color gamut), and a region encircled by dashed lines is the target color gamut. E is the point with the minimum lightness value in the target color gamut, lightness of the point E is the minimum lightness value of the target color gamut, and chroma of the point E is 0. G is any pixel in the color gamut of the to-be-processed image. H is an intersection point between an extension line of $\overline{EG}$ and a boundary of the color gamut of the target device. The pixel G in the color gamut of the to-be-processed image is mapped to the point H (color gamut mapping is performed based on vividness), that is, H is the mapping end point. G' is a point obtained by mapping G. To be specific, G' is a pixel that is in the color gamut of the processed image corresponding to the target color gamut and that is obtained by mapping the point G. All pixels in the to-be-processed image are mapped using the foregoing mapping method, to finally obtain color gamut information for displaying the to-be-processed image on the target device. Finally, the to-be-processed header is transferred to the target device for display.

Figure 18:
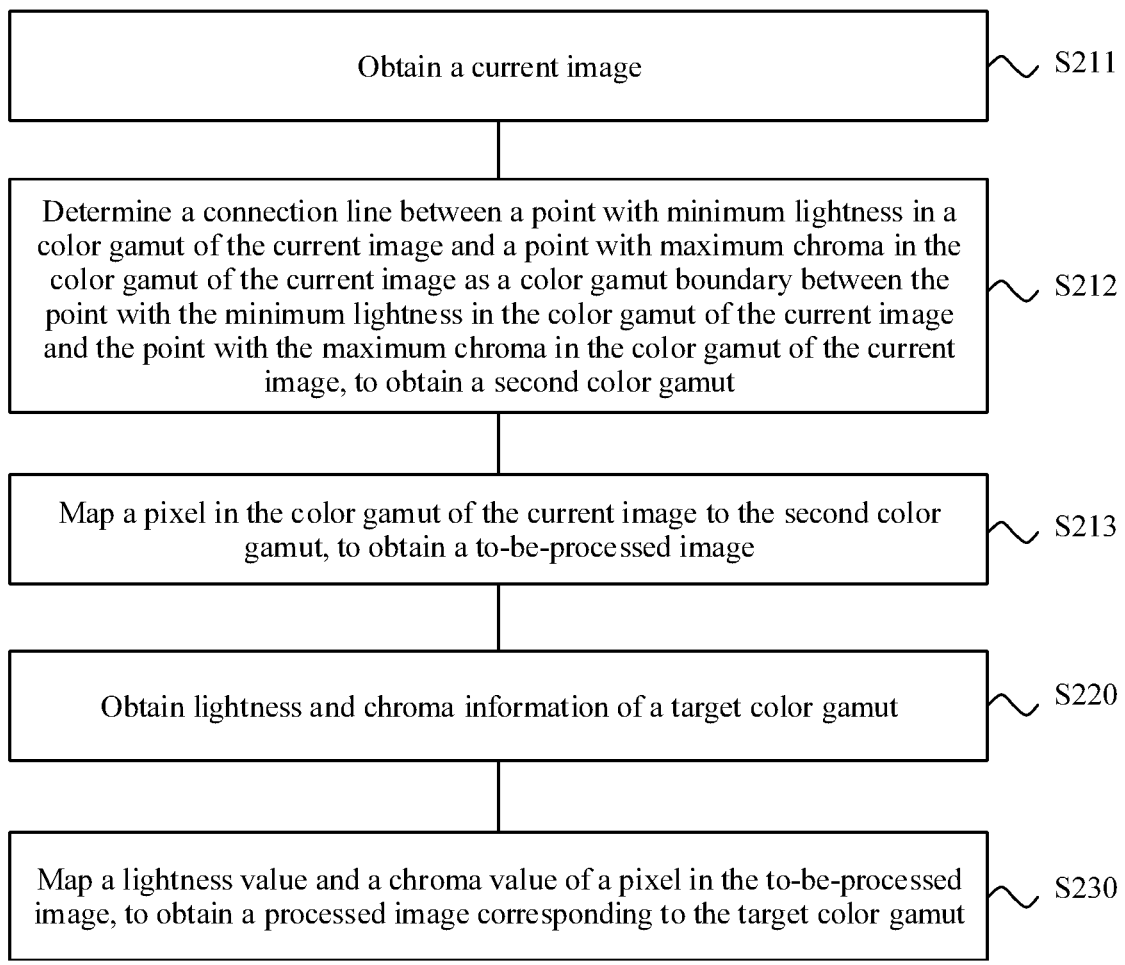
FIG. 18 is a schematic flowchart of a color gamut mapping method according to an embodiment of this application.

Optionally, in an embodiment, as shown in FIG. 18, the obtaining a to-be-processed image in S210 includes the following steps.

S211. Obtain a current image.

S212. Determine a connection line between a point with minimum lightness in a color gamut of the current image and a point with maximum chroma in the color gamut of the current image as a color gamut boundary between the point with the minimum lightness in the color gamut of the current image and the point with the maximum chroma in the color gamut of the current image, to obtain a second color gamut.

S213. Map a pixel in the color gamut of the current image to the second color gamut, to obtain the to-be-processed image.

Figure 19:
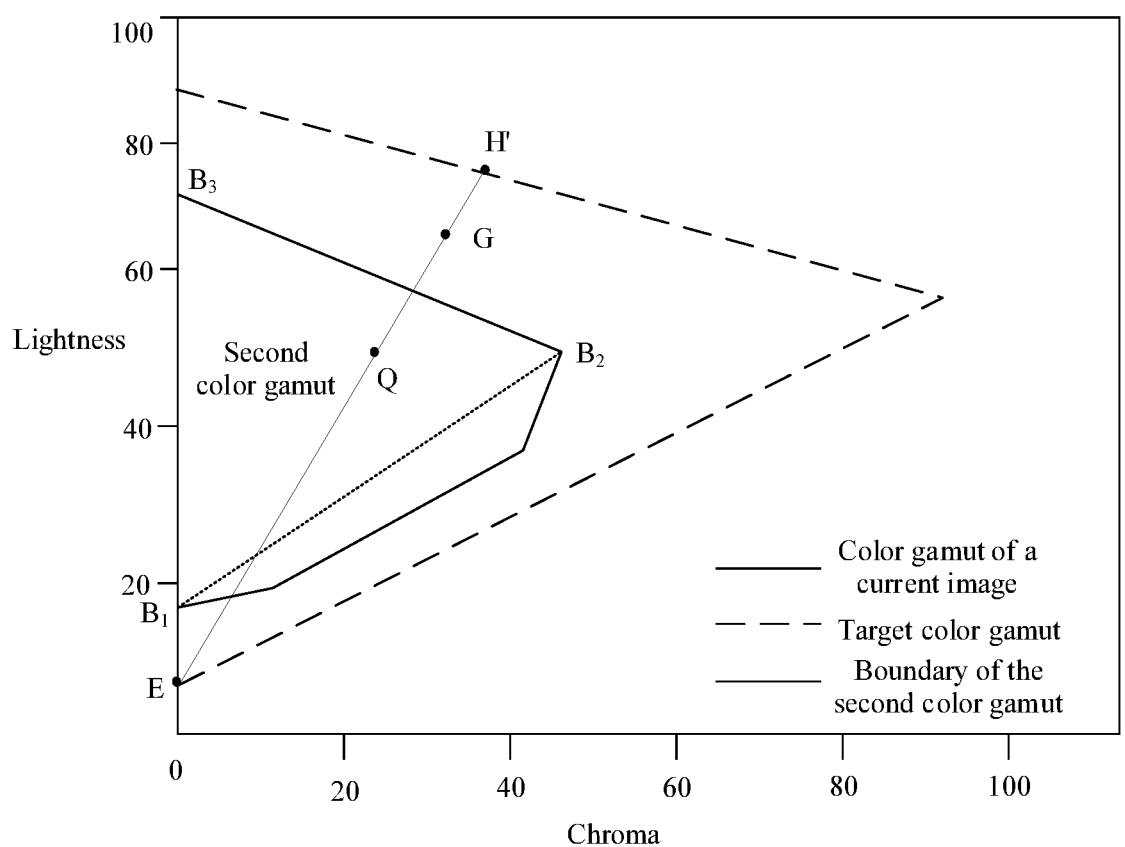
FIG. 19 is a schematic diagram of a color gamut mapping method according to an embodiment of this application.

Further, the current image is obtained before the to-be-processed image is obtained. A color gamut boundary between the point with the minimum lightness in the color gamut of the current image and a point with maximum chroma in the color gamut of the to-be-processed image may be a straight line, or may not be a straight line. When the color gamut boundary between the point with the minimum lightness in the color gamut of the current image and the point with the maximum chroma in the color gamut of the to-be-processed image is a straight line, the current image may be the to-be-processed image. When the color gamut boundary between the point with the minimum lightness in the color gamut of the current image and the point with the maximum chroma in the color gamut of the to-be-processed image is not a straight line, make-up needs to be performed on a boundary of the color gamut of the current image to obtain the to-be-processed image. FIG. 19 is a schematic diagram of a case in which the color gamut boundary between the point with the minimum lightness in the color gamut of the current image and the point with the maximum chroma in the color gamut of the to-be-processed image is not a straight line according to an embodiment of this application. In FIG. 19, the color gamut boundary between the point $B_1$ with the minimum lightness in the color gamut of the current image and the point $B_2$ with the maximum chroma in the color gamut of the to-be-processed image is a broken line (or may be a curve or the like), that is, the color gamut boundary is not a straight line. In this case, make-up needs to be performed on the color gamut boundary. A purpose is to reduce a calculation amount when color gamut mapping is subsequently performed based on vividness. This avoids a problem that an excessively large change of the color gamut of the current image in a vividness-based color gamut mapping process increases a calculation amount and reduces mapping accuracy and precision in the mapping process, thereby affecting quality of an image finally displayed on the target device. This avoids an inaccurate mapping result such that a color obtained by mapping the to-be-processed image is closer to that of the original image, thereby improving a user's perception of the color obtained by mapping the to-be-processed image.

It is assumed that the color gamut boundary between the point with the minimum lightness in the color gamut of the current image and the point with the maximum chroma in the color gamut of the current image is not a straight line. In S211, the current image is obtained. In S212, the connection line between the point $B_1$ with the minimum lightness in the color gamut of the current image and the point $B_2$ with the maximum chroma in the color gamut of the to-be-processed image is determined as the color gamut boundary between the point with the minimum lightness in the color gamut of the current image and the point with the maximum chroma in the color gamut of the to-be-processed image, as shown by a dotted line in FIG. 19, to obtain the second color gamut. Other boundaries of the second color gamut coincide with locations of corresponding boundaries of the color gamut of the current image. To be specific, a boundary between the point $B_1$ with maximum lightness and the point $B_2$ with the maximum chroma in the color gamut of the current image, and a boundary on a lightness axis are the other boundaries of the second color gamut. That is, a range of the second color gamut is determined. The second color gamut may be referred to as a make-up gamut (MSG). As shown in FIG. 19, boundaries of the second color gamut form a triangular region encircled by $B_1$, $B_2$, and $B_3$, and $B_3$ is the point with the maximum lightness in the color gamut of the current image. In S213, the pixel in the color gamut of the current image is mapped to the second color gamut, to obtain the to-be-processed image. For example, a pixel G in the color gamut of the current image is mapped to the second color gamut, to obtain a pixel Q. Lightness and chroma of the point Q are within a lightness range and a chroma range of the second color gamut respectively. That is, the to-be-processed image is obtained. Finally, the lightness value and the chroma value of the pixel in the to-be-processed image are mapped to obtain the processed image corresponding to the target color gamut. To be specific, the pixel Q in the second color gamut is mapped to H', where H' is an intersection point between an extension line of $\overline{EQ}$ and a boundary of the target color gamut. E is a point with the minimum lightness value in the target color gamut, and chroma of E is 0. After color gamut mapping is performed on the point Q based on vividness, color gamut information for displaying, in the target color gamut, the pixel G in the color gamut of the to-be-processed image after the pixel G undergoes color gamut mapping based on vividness is obtained. That is, the processed image corresponding to the target color gamut is obtained.

According to the color gamut mapping method provided in this application, when the color gamut boundary between the point with the minimum lightness in the color gamut of the current image and the point with the maximum chroma in the color gamut of the current image is not a straight line, the connection line between the point with the minimum lightness in the color gamut of the current image and the point with the maximum chroma in the color gamut of the current image is first determined as the color gamut boundary between the point with the minimum lightness in the color gamut of the current image and the point with the maximum chroma in the color gamut of the to-be-processed image, to obtain the second color gamut, and the pixel in the current image is mapped to the second color gamut, to obtain the color gamut of the to-be-processed image. This avoids a problem that an excessively large change of the color gamut of the current image in a vividness-based color gamut mapping process increases a calculation amount and reduces mapping accuracy and precision in the mapping process, thereby affecting quality of the processed image finally displayed. This avoids an inaccurate mapping result such that a color obtained by mapping the current image is closer to that of the original image, thereby improving a user's perception of the color obtained by mapping the current image, and improving user experience.

It should be understood that when another color gamut boundary of the color gamut of the current image is not a straight line, make-up may also be performed on the color gamut boundary in a manner similar to the foregoing manner. This is not limited in this embodiment of this application.

It should be further understood that when the color gamut boundary between the point with the minimum lightness in the color gamut of the current image and the point with the maximum chroma in the color gamut of the current image is not a straight line, make-up may not be performed on the boundary, but the lightness value and the chroma value of the pixel in the current image are directly mapped to obtain the processed image corresponding to the target color gamut. That is, color gamut mapping is performed based on vividness. This is not limited in this embodiment of this application.

Figure 20:
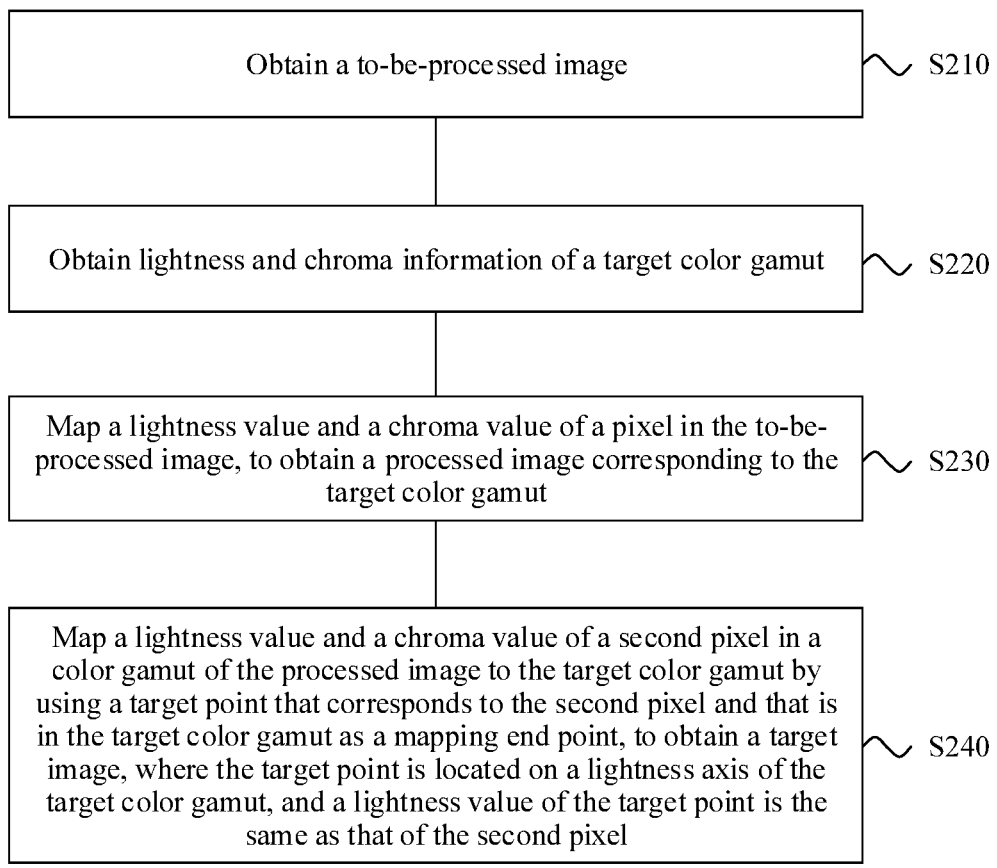
FIG. 20 is a schematic flowchart of a color gamut mapping method according to an embodiment of this application.

Optionally, in an embodiment, as shown in FIG. 20, the method 200 further includes the following step.

S240. Map a lightness value and a chroma value of a second pixel in a color gamut of the processed image to the target color gamut using a target point that corresponds to the second pixel and that is in the target color gamut as a mapping end point, to obtain a target image, where the target point is located on a lightness axis of the target color gamut, and a lightness value of the target point is the same as that of the second pixel.

Further, after the lightness value and the chroma value of the pixel in the to-be-processed image are mapped to obtain the processed image corresponding to the target color gamut, the lightness value and the chroma value of the second pixel in the color gamut of the processed image further need to be mapped to the target color gamut using the target point corresponding to any pixel (the second pixel) in the target color gamut as the mapping end point, to obtain the target image. Optionally, the second pixel is a pixel that is in the color gamut of the processed image and whose lightness is less than a maximum lightness value in the color gamut of the processed image.

Figure 21:
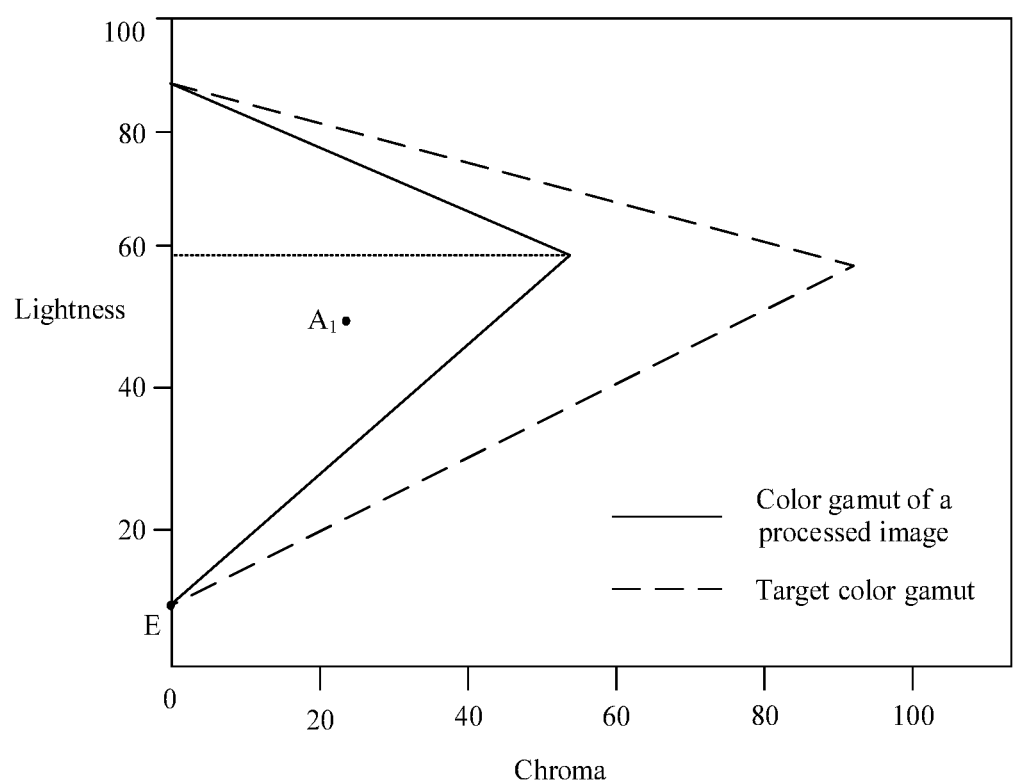
FIG. 21 is a schematic diagram of a color gamut mapping method according to an embodiment of this application.

Further, after color gamut mapping is performed based on vividness, experience with vividness of displaying the to-be-processed image on the target device is enhanced. However, due to directivity of the vividness-based color gamut mapping, a small part of the target color gamut may not be fully utilized. Therefore, chroma of a color in this part of color gamut needs to be mapped, to fully utilize the target color gamut and improve a preference of human eyes. That is, the second pixel (which may be any pixel in the color gamut of the processed image) is mapped to the target color gamut. Optionally, the second pixel is a pixel that is in the color gamut of the processed image and whose lightness is less than the maximum lightness value in the color gamut of the processed image. As shown in FIG. 21, a pixel $A_1$ is the second pixel, dashed lines indicate the target color gamut, and solid lines indicate the color gamut of the processed image. It can be learned that a lightness value of the point $A_1$ is less than the maximum lightness value in the color gamut of the processed image. That is, the second pixel may be a pixel that does not fully utilize chroma of the target color gamut. Optionally, in a process of mapping the second pixel to the color gamut of the target device, the lightness of the second pixel remains unchanged.

According to the color gamut mapping method provided in this application, after the color gamut of the processed image is obtained, chroma mapping may be further performed on a pixel that does not fully utilize the chroma of the target color gamut, to fully utilize the target color gamut and improve a preference of human eyes. Further, a color obtained by mapping the to-be-processed image is closer to that of the original image, thereby improving a user's perception of the color obtained by mapping the to-be-processed image, and improving user experience.

Optionally, in an embodiment, mapping a lightness value and a chroma value of a pixel in the to-be-processed image, to obtain a processed image corresponding to the target color gamut in S230 includes performing mapping based on the following formula (11):

$$\overline{EG'} = \overline{EH} * \left( \frac{EG}{EH_1} - \frac{ER}{EU} * \frac{\overline{GH_1}}{\overline{H_2 H_1}} \right). \quad (11)$$

Figure 22:
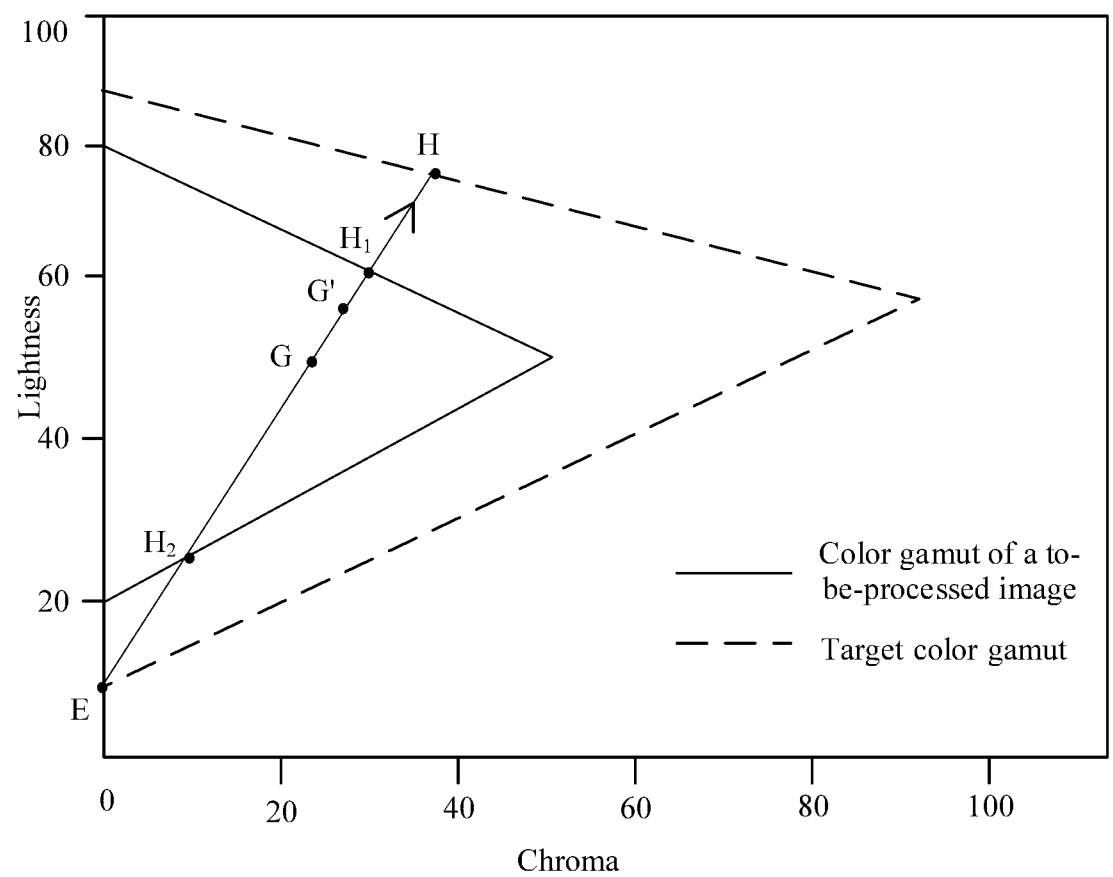
FIG. 22 is a schematic diagram of a color gamut mapping method according to an embodiment of this application.

A case shown in FIG. 22 is used as an example for description. As shown in FIG. 22, in the formula (11), a region encircled by dashed lines is the target color gamut, and a region encircled by solid lines is the color gamut of the to-be-processed image. E is the mapping end point, lightness of the point E is the minimum lightness value of the color gamut of the target device, chroma of the point E is 0, G is any pixel in the color gamut of the to-be-processed image, $\overline{EG}$ is a distance between the points E and G, H is an intersection point between an extension line of $\overline{EG}$ and a boundary of the target color gamut, $\overline{EH}$ is a distance between the points E and H, $H_1$ is an intersection point between an extension line of $\overline{EG}$ and a color gamut boundary between a point with maximum lightness in the color gamut of the to-be-processed image and a point with maximum chroma in the color gamut of the to-be-processed image, $\overline{GH_1}$ is a distance between the points G and $H_1$, $\overline{EH_1}$ is a distance between the points E and $H_1$, R is a point with minimum lightness in the color gamut of the to-be-processed image, $\overline{ER}$ is a distance between the points E and R, U is the point with the maximum lightness in the color gamut of the to-be-processed image, $\overline{EU}$ is a distance between the points E and U, $H_2$ is an intersection point between $\overline{EG}$ and a color gamut boundary between the point with the minimum lightness in the color gamut of the to-be-processed image and the point with the maximum chroma in the color gamut of the to-be-processed image, $\overline{H_1 H_2}$ is a distance between the points $H_1$ and $H_2$, G' is a point obtained by mapping G, and $\overline{EG'}$ is a distance between E and G'. G' is obtained by performing color gamut mapping on the point G based on vividness and using the formula (11). To be specific, color gamut information of G' is color gamut information of the point G in the target color gamut after the point G undergoes the foregoing vividness-based color gamut mapping.

According to the color gamut mapping method provided in this application, color gamut mapping is performed based on vividness and using the formula (11). This can improve accuracy of color gamut mapping, improve calculation efficiency, implement mapping from a single color to another single color, prevent blurring of details, and the like. Mapping complexity is reduced. Calculation costs of color gamut mapping are reduced such that a mapped image is brighter. This improves a user's perception of a color obtained by mapping the to-be-processed image, and improves user experience.

It should be understood that, in this embodiment of this application, in addition to the formula (11) used for color gamut mapping based on vividness, another formula or any other possible variant formula of the formula (11) may be used for color gamut mapping. This is not limited in this embodiment of this application.

Optionally, in an embodiment, mapping a pixel in the color gamut of the current image to the second color gamut, to obtain the to-be-processed image in S222 includes mapping the pixel in the color gamut of the current image to the second color gamut based on the following formula (12), to obtain the to-be-processed image:

$$\overline{OQ} = \begin{cases} \overline{OG}; \overline{OG} \le y * \overline{OW_1} \\ y * \overline{OW_1} + \frac{\overline{OG} - y * \overline{OW_1}}{\overline{OW_2} - y * \overline{OW_1}} * (1-y) * \overline{OW_1}; \overline{OG} > y * \overline{OW_1} \end{cases}. \quad (12)$$

In the formula (12), G is any pixel in the color gamut of the current image, O is the mapping end point, a lightness value of O is the same as that of G, a chroma value of O is 0, $W_1$ is an intersection point between $\overline{OG}$ and a boundary of the second color gamut, $W_2$ is an intersection point between $\overline{OG}$ and a boundary of the color gamut of the current image, $\overline{OG}$ is a distance between the point O and the point G, $\overline{OW_1}$ is a distance between the point O and the point $W_1$, $\overline{OW_2}$ is a distance between the point O and the point $W_2$, Q is a pixel obtained by mapping G, $\overline{OQ}$ is a distance between O and Q, and y is a coefficient with a value range of $0.7 \le y \le 0.95$.

Figure 23:
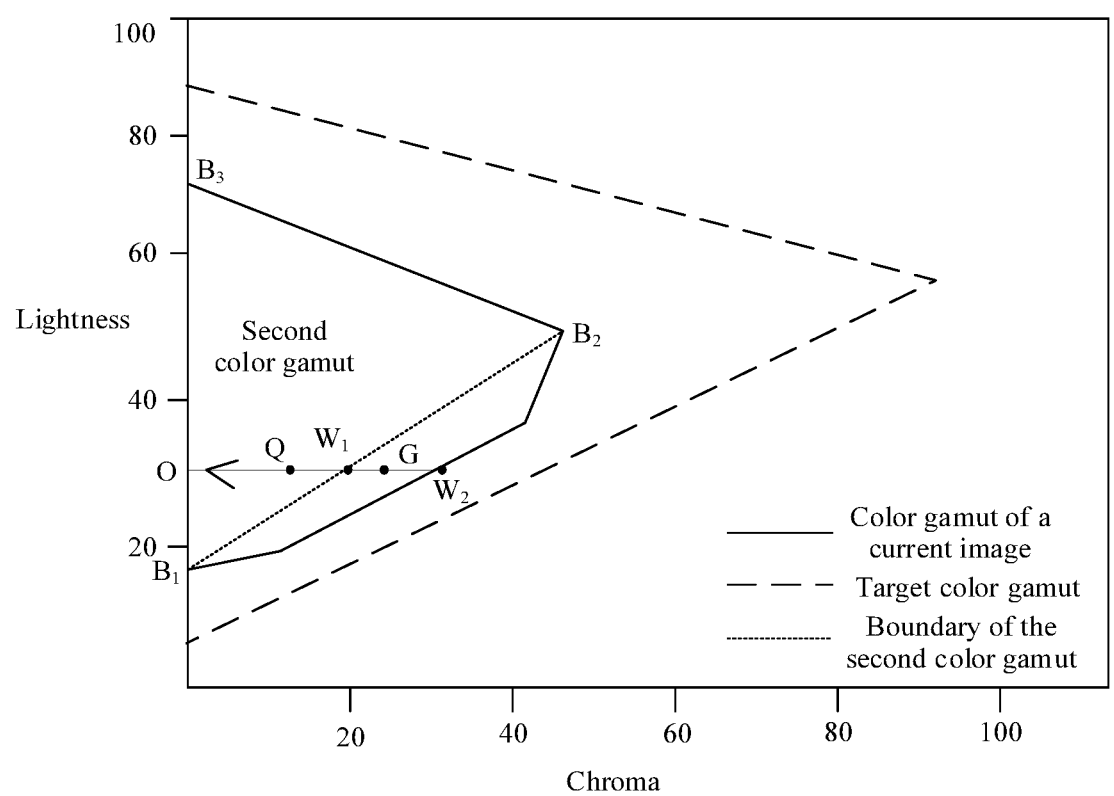
FIG. 23 is a schematic diagram of mapping a pixel in a color gamut of the to-be-processed image to a second color gamut according to an embodiment of this application.

A case shown in FIG. 23 is used as an example for description. FIG. 23 is a schematic diagram of mapping the pixel in the color gamut of the current image to the second color gamut according to an embodiment of this application. As shown in FIG. 23, boundaries of the second color gamut form a triangular region encircled by $B_1$, $B_2$, and $B_3$. A region encircled by solid lines is the color gamut of the current image. A region encircled by dashed lines is the target color gamut. G is any pixel in the color gamut of the current image, O is the mapping end point, a lightness value of O is the same as that of G, a chroma value of O is 0, $W_1$ is an intersection point between $\overline{OG}$ and a boundary of the second color gamut, $W_2$ is an intersection point between an extension line of $\overline{OG}$ and a boundary of the color gamut of the current image, $\overline{OG}$ is a distance between the point O and the point G, $\overline{OW_1}$ is a distance between the point O and the point $W_1$, $\overline{OW_2}$ is a distance between the point O and the point $W_2$, Q is a point obtained by mapping G, that is, a corresponding pixel that is in the second color gamut and that is finally obtained through mapping, $\overline{OQ}$ is a distance between O and Q, and y is a coefficient with a value range of $0.7 \le y \le 0.95$.

A meaning of the formula (12) is as follows. If the pixel G in the color gamut of the current image is within y times the range of the second color gamut, for example, a value of y is 0.8, that is, if the pixel G in the color gamut of the current image is within 80% of the range of the second color gamut, that is, $\overline{OG} \le 0.8 * \overline{OW_1}$, a color obtained by performing color gamut mapping on the pixel G is the same as a color shown before the pixel G undergoes color gamut mapping. However, if the pixel N in the color gamut of the current image is beyond 80% of the range of the second color gamut, that is, $\overline{OG} > 0.8 * \overline{OW_1}$, the pixel N is transformed into a range of the second color gamut using the formula (11). In this way, the pixel in the color gamut of the current image is mapped to the second color gamut, to obtain the to-be-processed image.

According to the color gamut mapping method provided in this application, the pixel in the color gamut of the current image is mapped to the second color gamut using the formula (12). This can improve accuracy of color gamut mapping, improve calculation efficiency, and reduce complexity of color gamut mapping. Calculation costs of color gamut mapping are reduced, thereby facilitating implementation.

It should be understood that, in this embodiment of this application, in addition to the formula (12) used for mapping the pixel in the color gamut of the to-be-processed image to the first color gamut, another formula or any other possible variant formula of the formula (12) may be used for color gamut mapping. This is not limited in this embodiment of this application.

Optionally, in an embodiment, mapping a lightness value and a chroma value of a second pixel in a color gamut of the processed image to the target color gamut using a target point that corresponds to the second pixel and that is in the target color gamut as a mapping end point, to obtain a target image in S240 includes mapping the second pixel based on the following formula (13), to obtain the target image:

$$\overline{BF'} = \begin{cases} \overline{BF}; \overline{BF} \leq i * \overline{BD_2} \\ i * \overline{BD_2} + \dfrac{\overline{BF} - i * \overline{BD_2}}{(1-i) * \overline{BD_2}} * (\overline{BD_1} - i * \overline{BD_2}); \overline{BF} > i * \overline{BD_2} \end{cases} \quad (13)$$

In the formula (13), F is the second pixel, lightness of a point B is the same as that of F, chroma of the point B is 0, $\overline{BF}$ is a distance between the point B and the point F, $D_1$ is an intersection point between $\overline{BF}$ and a boundary of the target color gamut, B is the mapping end point, $\overline{BD_1}$ is a distance between the point B and the point $D_1$, $D_2$ is an intersection point between $\overline{BF}$ and a boundary of the color gamut of the processed image, $\overline{BD_2}$ is a distance between the point B and the point $D_2$, F' is a point obtained by mapping F, $\overline{BF'}$ is a distance between the point B and F', and i is a coefficient with a value range of 0.4≤i≤0.7.

Figure 24:
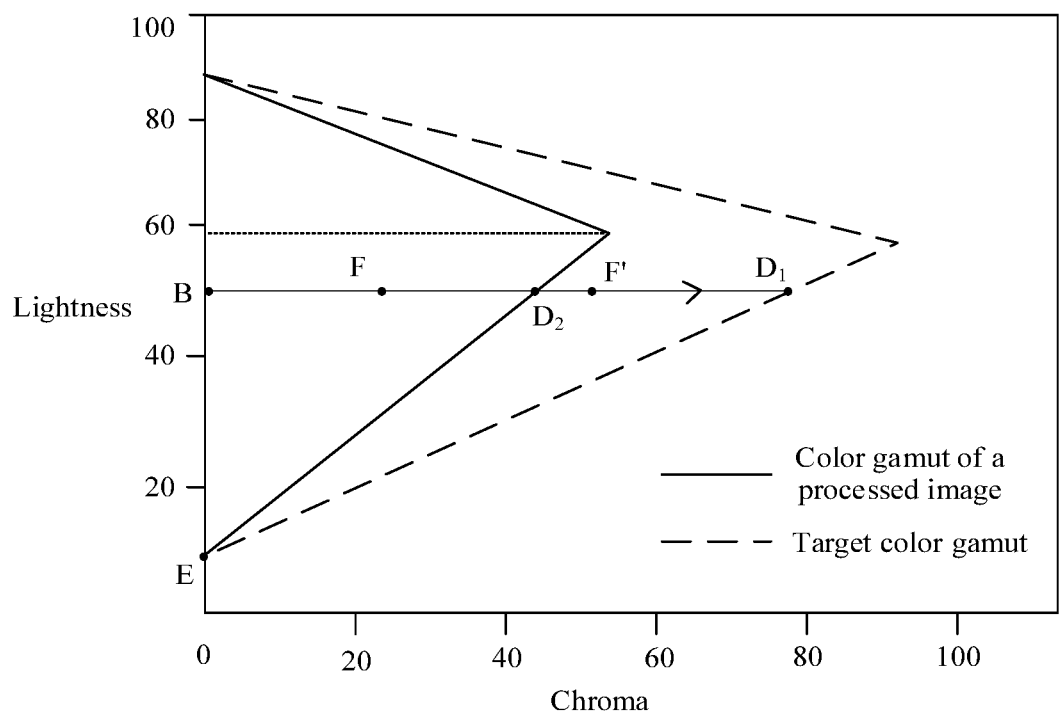
FIG. 24 is a schematic diagram of mapping a second pixel to a color gamut of the target device according to an embodiment of this application.

A case shown in FIG. 24 is used as an example for description. FIG. 24 is a schematic diagram of mapping the second pixel to obtain the target image according to an embodiment of this application. As shown in FIG. 24, a region encircled by solid lines is the color gamut of the processed image, and a region encircled by dashed lines is the target color gamut. F is the second pixel, and is located in the color gamut of the processed image, a lightness value of F is less than a maximum lightness value in the color gamut of the processed image, lightness of the point B is the same as that of F, chroma of the point B is 0, $\overline{BF}$ is a distance between the point B and the point F, $D_1$ is an intersection point between an extension line of $\overline{BF}$ and a boundary of the target color gamut, $D_1$ is the mapping end point, $\overline{BD_1}$ is a distance between the point B and the point $D_1$, $D_2$ is an intersection point between an extension line of $\overline{BF}$ and a boundary of a color gamut obtained through vividness-based color gamut mapping, $\overline{BD_2}$ is a distance between the point B and the point $D_2$, F' is a point obtained by mapping F, that is, a corresponding pixel that is in the target color gamut and that is finally obtained by mapping the point F, and i is a coefficient with a value range of i is 0.4≤i≤0.7. Lightness of the second pixel remains unchanged in the mapping process.

A meaning of the formula (12) is as follows. If the second pixel F is within i times the range of the color gamut of the processed image, for example, a value of y is 0.6, that is, if the second pixel F is within 60% of the range of the color gamut of the processed image, that is, $\overline{BF} \leq 0.6 * \overline{BD_2}$, a color obtained by performing color gamut mapping on the second pixel F is the same as a color shown before the second pixel F undergoes color gamut mapping. However, if the second pixel F is beyond 60% of the range of the color gamut of the processed image, that is, $\overline{BF} > 0.6 * \overline{BD_2}$, the second pixel F is transformed into a range of the target color gamut using the formula (13). In this way, chroma mapping is performed on a pixel that does not fully utilize chroma of the target color gamut, to fully utilize the color gamut of the target device and improve a preference of human eyes.

According to the color gamut mapping method provided in this application, chroma mapping is performed, using the formula (13), on the pixel that does not fully utilize the chroma of the target color gamut, to fully utilize the target color gamut. This can improve accuracy of color gamut mapping, improve calculation efficiency, and reduce mapping complexity. Calculation costs of color gamut mapping are reduced such that a mapped image is brighter. This improves a user's perception of a color obtained by mapping the to-be-processed image, and improves user experience.

It should be understood that, in this embodiment of this application, in addition to the formula (13) used for color gamut mapping, another formula or any other possible variant formula of the formula (13) may be used for color gamut mapping. This is not limited in this embodiment of this application.

Optionally, in an embodiment, a lightness range of the color gamut of the to-be-processed image is within a lightness range of the target color gamut, and/or a chroma range of the color gamut of the to-be-processed image is within a chroma range of the target color gamut.

Further, in the foregoing embodiments of this application, a range of the target color gamut may include a range of the color gamut of the to-be-processed image. To be specific, the lightness range of the target color gamut includes the lightness range of the color gamut of the to-be-processed image, and the chroma range of the target color gamut includes the chroma range of the color gamut of the to-be-processed image, as shown in FIG. 17, FIG. 19, and FIG. 21 to FIG. 23. That is, the foregoing color gamut mapping method may be used in a color gamut extension scenario, and the mapping method is a mapping method based on color gamut extension. The method may be used in a mapping process of performing transferring from a display device with a narrower color gamut to a display device with a wider color gamut. Alternatively, the range of the target color gamut may partially include the range of the color gamut of the to-be-processed image. For example, the lightness range of the target color gamut includes the lightness range of the color gamut of the to-be-processed image, and the chroma range of the target color gamut does not include (does not overlap or partially overlaps) the chroma range of the color gamut of the to-be-processed image. That is, the color gamut mapping method provided in this embodiment of this application may also be used when the range of the color gamut of the to-be-processed image partially overlaps the range of the target color gamut.

Optionally, the method further includes displaying the processed image or the target image.

Further, after the to-be-processed image is mapped, the processed image or the target image is obtained, and a terminal device may display the image to a user. For example, the to-be-processed image may be an image obtained by an image obtaining apparatus (for example, a camera) of a terminal device, and after the terminal device processes the image, a display screen of the terminal device may display the processed image or the target image to a user. Alternatively, the to-be-processed image may be an image displayed on a display screen of a terminal device, and another terminal device obtains the to-be-processed image, processes the image, and displays the processed image or the target image to a user.

In this embodiment of this application, the color gamut of the to-be-processed image may be sRGB, and the target color gamut may be DCI-P3 or BT2020, or the color gamut of the to-be-processed image may be DCI-P3, and the target color gamut may be BT2020, or the like. This is not limited in this embodiment of this application.

It should be understood that, in this embodiment of this application, the color gamut of the to-be-processed image and the target color gamut may be alternatively another type of color gamut. This is not limited in this embodiment of this application.

It should be understood that the color gamut mapping method provided in this application may also be used when the lightness range of the target color gamut is within the lightness range of the color gamut of the to-be-processed image, and/or the chroma range of the target color gamut is within the chroma range of the color gamut of the to-be-processed image. This is not limited in this embodiment of this application.

It should be further understood that, in the embodiments of this application, "first", "second", and the like are merely intended to indicate that a plurality of objects is different. For example, the first color gamut and the second color gamut are merely intended to indicate color gamuts with different ranges, without any impact on the color gamuts. The "first", "second", and the like should not be construed as any limitation on the embodiments of this application.

It should be further understood that, the foregoing examples are merely intended to help a person skilled in the art better understand the embodiments of the present disclosure, instead of limiting the scope of the embodiments of the present disclosure. Obviously, a person skilled in the art may make various equivalent modifications or changes, or add some new steps, or the like based on the foregoing examples. Alternatively, any two or more of the foregoing embodiments are combined. A modified, changed, or combined solution also falls within the scope of the embodiments of this application.

It should be further understood that, sequence numbers of the foregoing processes do not mean execution sequences. The execution sequences of the processes should be determined according to functions and internal logic of the processes, and should not be construed as any limitation on the implementation processes of the embodiments of this application.

The foregoing describes in detail the color gamut mapping method in the embodiments of this application with reference to FIG. 1 to FIG. 24. The following describes a color gamut mapping apparatus in the embodiments of this application with reference to FIG. 25 to FIG. 29. It should be understood that the color gamut mapping apparatus in FIG. 25 to FIG. 28 can perform the color gamut mapping method in the embodiments of this application. For brevity, repeated descriptions of the color gamut mapping apparatus in the embodiments of this application are properly omitted below.

Figure 25:
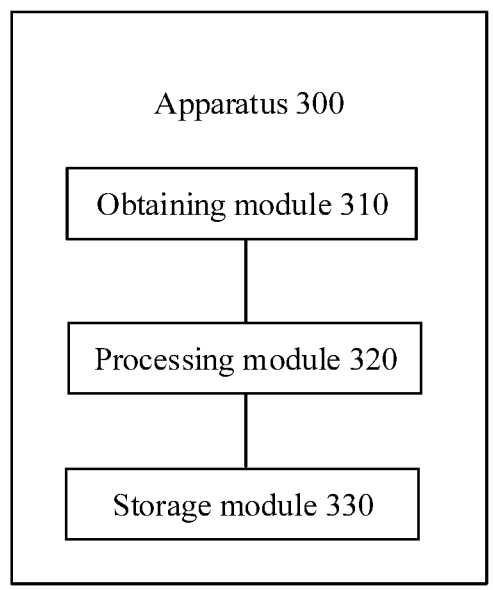
FIG. 25 is a schematic block diagram of a color gamut mapping apparatus according to an embodiment of this application.

FIG. 25 is a schematic block diagram of a color gamut mapping apparatus according to an embodiment of this application. The color gamut mapping apparatus 300 in FIG. 25 can perform the steps of the color gamut mapping method that are shown in FIG. 6, FIG. 7, and FIG. 9 in this application.

As shown in FIG. 25, the color gamut mapping apparatus 300 further includes an obtaining module 310 configured to obtain a to-be-processed image, where the obtaining module 310 is further configured to obtain lightness and chroma information of a target color gamut, and a processing module 320 configured to map a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

According to the color gamut mapping apparatus provided in this embodiment of this application, in a process of transferring the to-be-processed image (a source image) to the target color gamut for display, color gamut mapping may be performed based on vividness and the lightness and chroma information of the target color gamut. To be specific, lightness values and chroma values of all pixels in the color gamut of the to-be-processed image are mapped to the point with the minimum lightness in the target color gamut. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, where the mapping end point indicates a mapping direction and a mapping distance, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

Optionally, in an embodiment, the obtaining module 310 is further configured to obtain a current image, the processing module 320 is further configured to perform lightness mapping on a pixel in a color gamut of the current image, to obtain a first color gamut, where a lightness range of the first color gamut is the same as that of the target color gamut, and the processing module 320 is further configured to map the pixel in the color gamut of the current image to the first color gamut, to obtain the to-be-processed image.

Optionally, in an embodiment, the processing module 320 is further configured to in a process of performing lightness mapping on the pixel in the color gamut of the current image, keep chroma of the pixel in the color gamut of the current image unchanged.

Optionally, in an embodiment, a lightness value and a chroma value of a first pixel in a color gamut of the processed image are mapped to the target color gamut using a target point that corresponds to the first pixel and that is in the target color gamut as a mapping end point, to obtain a target image, where the target point is located on a lightness axis of the target color gamut, and a lightness value of the target point is the same as that of the first pixel.

Optionally, in an embodiment, the processing module 320 is further configured to map the lightness value and the chroma value of the pixel in the to-be-processed image based on the following formula, to obtain the processed image corresponding to the target color gamut:

$$\overline{EP'} = \begin{cases} \overline{EP}; \overline{EP} \le k * \overline{EP_d} \\ k * \overline{EP_d} + \dfrac{\overline{EP} - k * \overline{EP_d}}{\overline{EP_s} - k * \overline{EP_d}} * (1-k) * \overline{EP_d}; \overline{EP} > k * \overline{EP_d} \end{cases},$$

where E is the mapping end point, lightness of the point E is the minimum lightness value of the target color gamut, chroma of the point E is 0, P is the pixel in the color gamut of the to-be-processed image, $\overline{EP}$ is a distance between P and E, $P_d$ is an intersection point between $\overline{EP}$ and a boundary of the target color gamut, $\overline{EP_d}$ is a distance between E and $P_d$, $P_s$ is an intersection point between $\overline{EP}$ and a boundary of the color gamut of the to-be-processed image, $\overline{EP_s}$ is a distance between E and $P_s$, P' is a point that is in the processed image corresponding to the target color gamut and that is obtained by mapping P using the foregoing formula, $\overline{EP'}$ is a distance between E and P', and k is a coefficient with a value range of 0.7≤k≤0.95.

Optionally, in an embodiment, the processing module 320 is further configured to perform lightness mapping on the pixel in the color gamut of the current image based on the following formula, to obtain the first color gamut:

$$L'_C = \dfrac{L_C - \min(L_o)}{\max(L_o) - \min(L_o)} * (\max(L_r) - \min(L_r)) + \min(L_r),$$

where C is the pixel in the color gamut of the current image, $L_C$ is lightness of the pixel C, $\min(L_o)$ is a minimum lightness value of the color gamut of the current image, $\max(L_o)$ is a maximum lightness value of the color gamut of the current image, $\min(L_r)$ is the minimum lightness value of the target color gamut, $\max(L_r)$ is a maximum lightness value of the target color gamut, C' is a point obtained by mapping C using the foregoing formula, and $L_{C'}$ is lightness of C'.

Optionally, in an embodiment, the processing module 320 is further configured to map the pixel in the color gamut of the current image to the first color gamut based on the following formula, to obtain the to-be-processed image:

$$\overline{MN'} = \begin{cases} \overline{MN}; \overline{MN} \le t * \overline{MS_1} \\ t * \overline{MS_1} + \dfrac{\overline{MN} - t * \overline{MS_1}}{\overline{MS_2} - t * \overline{MS_1}} * (1-t) * \overline{MS_1}; \overline{MN} > t * \overline{MS_1} \end{cases},$$

where M is the mapping end point, lightness of M is half of a sum of the minimum lightness value and the maximum lightness value of the color gamut of the current image, chroma of M is 0, N is the pixel in the color gamut of the current image, $\overline{MN}$ is a distance between the point M and the point N, $S_1$ is an intersection point between $\overline{MN}$ and a boundary of the first color gamut, $S_2$ is an intersection point between $\overline{MN}$ and a boundary of the color gamut of the current image, $\overline{MS_1}$ is a distance between the point M and the point $S_1$, $\overline{MS_2}$ is a distance between the point M and the point $S_2$, N' is a point obtained by mapping N, $\overline{MN'}$ is a distance between the point M and N', and t is a coefficient with a value range of 0.7≤t≤0.95.

Optionally, in an embodiment, the processing module 320 is further configured to map the first pixel to the target color gamut based on the following formula, to obtain the target image:

$$\overline{AZ'} = \begin{cases} \overline{AZ}; \overline{AZ} \le k * \overline{AX_1} \\ k * \overline{AX_1} + \dfrac{\overline{AZ} - k * \overline{AX_1}}{\overline{AX_2} - k * \overline{AX_1}} * (1-k) * \overline{AX_1}; \overline{AZ} > k * \overline{AX_1} \end{cases},$$

where A is the mapping end point, Z is the first pixel, lightness of the point A is the same as that of Z, chroma of the point A is 0, $\overline{AZ}$ is a distance between the point A and the point Z, $X_1$ is an intersection point between $\overline{AZ}$ and a boundary of the target color gamut, $\overline{AX_1}$ is a distance between the point A and the point $X_1$, $X_2$ is an intersection point between $\overline{AZ}$ and a boundary of the color gamut of the processed image, $\overline{AX_2}$ is a distance between the point A and the point $X_2$, Z' is a point obtained by mapping Z, $\overline{AZ'}$ is a distance between A and Z', and k is a coefficient with a value range of 0.7≤k≤0.95.

Optionally, in an embodiment, a lightness range of the target color gamut is within a lightness range of the color gamut of the to-be-processed image, and/or a chroma range of the target color gamut is within a chroma range of the color gamut of the to-be-processed image.

It should be understood that the color gamut mapping apparatus 300 may further include a storage module 330 configured to store program code. The processing module 320 is configured to invoke the program code to control the receiving module 310 to implement the method in the foregoing embodiments of this application.

It should be further understood that the color gamut mapping apparatus 300 may include a display module and a photographing module. The display module is configured to display an image and the like. The display module may be a display, for example, a display screen. The photographing module may be a camera or the like.

It should be further understood that functions of the modules of the color gamut mapping apparatus 300 may be implemented in a form of computer software, or may be implemented in a form of electronic hardware, or may be implemented in a manner of combining software and hardware. This is not limited in this embodiment of this application.

Figure 26:
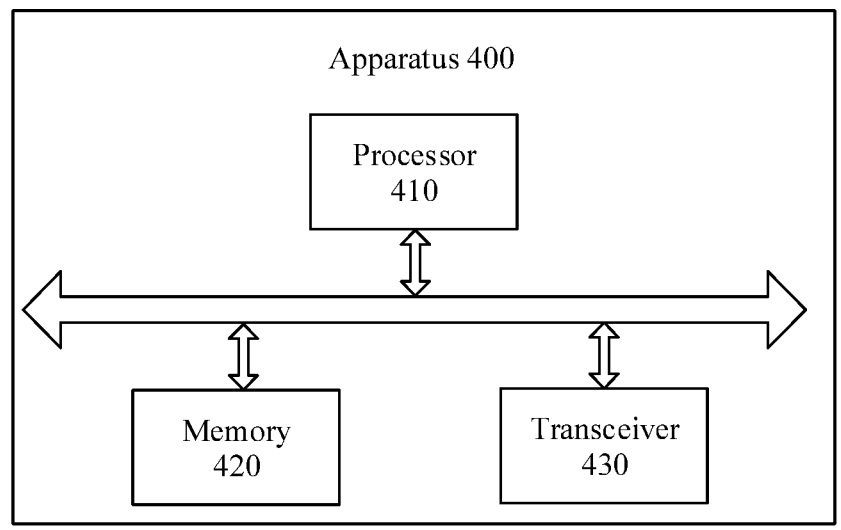
FIG. 26 is a schematic block diagram of a color gamut mapping apparatus according to another embodiment of this application.

It should be noted that, in this embodiment of this application, the processing module 320 may be implemented by a processor, the storage module 330 may be implemented by a memory, and the obtaining module 310 may be implemented by a transceiver. As shown in FIG. 26, a color gamut mapping apparatus 400 may include a processor 410, a memory 420, and a transceiver 430.

It should be understood that, the processor 420 in the embodiments of this application may be a central processing unit (CPU), or may further be another general purpose processor, a digital signal processor (DSP), an application-specific integrated circuit (ASIC), a field-programmable gate array (FPGA), or another programmable logical device, discrete gate or transistor logical device, discrete hardware component, or the like. The general purpose processor may be a microprocessor, or the processor may be any conventional processor or the like.

The memory 420 may include a read-only memory (ROM) and a random-access memory (RAM), and provide an instruction and data to the processor 410. A part of the memory 420 may further include a non-volatile RAM (NVRAM). For example, the memory 420 may further store information of a device type. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In an implementation process, steps in the foregoing methods can be implemented using a hardware integrated logical circuit in the processor 410, or using instructions in a form of software. The steps of the color gamut mapping method disclosed with reference to the embodiments of this application may be directly performed by a hardware processor, or may be performed using a combination of hardware in the processor 410 and a software module. The software module may be located in a storage medium. The storage medium is located in the memory 420, and the processor 410 reads information in the memory 420 and completes the steps in the foregoing methods in combination with the transceiver 430. To avoid repetition, details are not described herein again.

It may be understood that the memory in the embodiments of this application may be a volatile memory or a nonvolatile memory, or may include a volatile memory and a nonvolatile memory. The nonvolatile memory may be a ROM, a programmable ROM (PROM), an erasable PROM (EPROM), an electrically EPROM (EEPROM), or a flash memory. The volatile memory may be a RAM, used as an external cache. It should be noted that the memory of the systems and methods described in this specification includes but is not limited to these and any memory of another proper type.

The color gamut mapping apparatus 300 shown in FIG. 25 or the color gamut mapping apparatus 400 shown in FIG. 26 can implement the steps of the color gamut mapping method that are shown in FIG. 6, FIG. 7, and FIG. 9. To avoid repetition, details are not described herein again.

Figure 27:
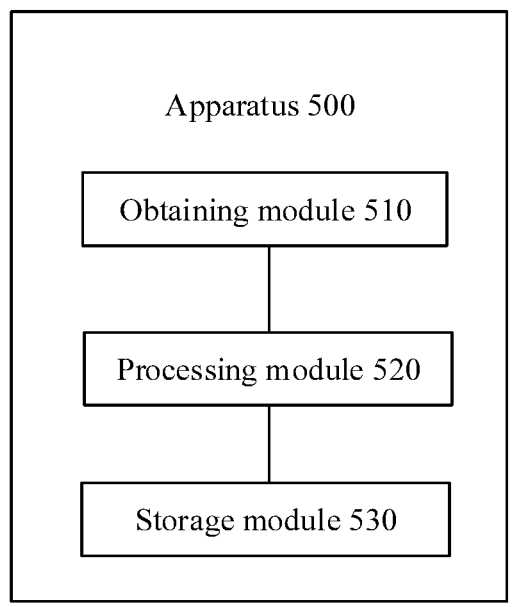
FIG. 27 is a schematic block diagram of a color gamut mapping apparatus according to an embodiment of this application.

FIG. 27 is a schematic block diagram of a color gamut mapping apparatus according to another embodiment of this application. The color gamut mapping apparatus 500 in FIG. 27 can perform the steps of the color gamut mapping method that are shown in FIG. 16, FIG. 18, and FIG. 20 in this application.

As shown in FIG. 27, the color gamut mapping apparatus 500 includes an obtaining module 510 configured to obtain a to-be-processed image, where the obtaining module 510 is further configured to obtain lightness and chroma information of a target color gamut, and a processing module 520 configured to map a lightness value and a chroma value of a pixel in the to-be-processed image, to obtain a processed image corresponding to the target color gamut, where a pixel in the processed image has a mapped lightness value and a mapped chroma value, and the mapped lightness value and the mapped chroma value are obtained by mapping the lightness value and the chroma value of the pixel in a color gamut of the to-be-processed image to the target color gamut using a point with a minimum lightness value in the target color gamut as a mapping end point.

According to the color gamut mapping apparatus provided in this application, in a process of transferring the to-be-processed image to the target color gamut for display, color gamut mapping may be performed based on vividness and the lightness and chroma information of the target color gamut. To be specific, lightness values and chroma values of all pixels in the color gamut of the to-be-processed image are mapped to the target color gamut using the point with the minimum lightness in the target color gamut as the mapping end point. Chroma of the point with the minimum lightness on the target device is 0. Finally, the processed image corresponding to the target color gamut is obtained. To be specific, the lightness value and the chroma value of the mapped image are obtained by mapping the lightness value and the chroma value of the pixel in the color gamut of the to-be-processed image to the target color gamut using the point with the minimum lightness value in the target color gamut as the mapping end point, instead of performing color gamut mapping on all the pixels in the color gamut of the to-be-processed image in a direction towards a high-chroma color in the target color gamut. The vividness indicator can better represent a color perception of human eyes and well reflect actual color experience of human eyes. A display effect of the processed image obtained by performing color gamut mapping on the to-be-processed image is improved, and vividness experience of human eyes is greatly improved with the target color gamut fully utilized such that the mapped image can be brighter and more favorable. This improves a user's perception of a color obtained by mapping the to-be-processed image, and improves user experience.

Optionally, in an embodiment, the obtaining module 510 is further configured to obtain a current image, the processing module 520 is further configured to determine a connection line between a point with minimum lightness in a color gamut of the current image and a point with maximum chroma in the color gamut of the current image as a color gamut boundary between the point with the minimum lightness in the color gamut of the current image and the point with the maximum chroma in the color gamut of the current image, to obtain a second color gamut, that is, the processing module 520 may be configured to replace a boundary that is of a color gamut of the current image and that is between a point with minimum lightness in the color gamut of the current image and a point with maximum chroma in the color gamut of the current image with a connection line between the point with the minimum lightness in the color gamut of the current image and the point with the maximum chroma in the color gamut of the current image, to obtain a second color gamut, and the processing module 520 is further configured to map a pixel in the color gamut of the current image to the second color gamut, to obtain the to-be-processed image.

Optionally, in an embodiment, the processing module 520 is further configured to map a lightness value and a chroma value of any pixel in a color gamut of the processed image to the target color gamut using a target point that corresponds to the any pixel and that is in the target color gamut as a mapping end point, to obtain a target image, where the target point is located on a lightness axis of the target color gamut, and a lightness value of the target point is the same as that of the any pixel.

Optionally, in an embodiment, the processing module 520 is further configured to map the lightness value and the chroma value of the pixel in the to-be-processed image based on the following formula, to obtain the processed image corresponding to the target color gamut:

$$\overline{EG'} = \overline{EH} * \left( \frac{\overline{EG}}{\overline{EH_1}} - \frac{\overline{ER}}{\overline{EU}} * \frac{\overline{GH_1}}{\overline{H_2H_1}} \right),$$

where E is the mapping end point, lightness of the point E is the minimum lightness value of the target color gamut, chroma of the point E is 0, G is a pixel in the color gamut of the to-be-processed image, $\overline{EG}$ is a distance between the points E and G, H is an intersection point between $\overline{EG}$ and a boundary of the target color gamut, $\overline{EH}$ is a distance between the points E and H, $H_1$ is an intersection point between $\overline{EG}$ and a color gamut boundary between a point with maximum lightness on a boundary of the color gamut of the to-be-processed image and a point with maximum chroma in the color gamut of the to-be-processed image, $\overline{GH_1}$ is a distance between the points G and $H_1$, $\overline{EH_1}$ is a distance between the points E and $H_1$, R is a point with minimum lightness in the color gamut of the to-be-processed image, $\overline{ER}$ is a distance between the points E and R, U is the point with the maximum lightness in the color gamut of the to-be-processed image, $\overline{EU}$ is a distance between the points E and U, $H_2$ is an intersection point between $\overline{EG}$ and a color gamut boundary between the point with the minimum lightness in the color gamut of the to-be-processed image and the point with the maximum chroma in the color gamut of the to-be-processed image, $\overline{H_1H_2}$ is a distance between the points $H_1$ and $H_2$, G' is a point obtained by mapping G, and $\overline{EG}$ is a distance between E and G'.

Optionally, in an embodiment, the pixel in the color gamut of the current image is mapped to the second color gamut based on the following formula, to obtain the to-be-processed image:

$$\overline{OQ} = \begin{cases} \overline{OG}; \overline{OG} \le y*\overline{OW_1} \\ y*\overline{OW_1} + \dfrac{\overline{OG}-y*\overline{OW_1}}{\overline{OW_2}-y*\overline{OW_1}} *(1-y)*\overline{OW_1}; \overline{OG} > y*\overline{OW_1} \end{cases},$$

where G is any pixel in the color gamut of the current image, O is the mapping end point, a lightness value of O is the same as that of G, a chroma value of O is 0, $W_1$ is an intersection point between $\overline{OG}$ and a boundary of the second color gamut, $W_2$ is an intersection point between $\overline{OG}$ and a boundary of the color gamut of the current image, $\overline{OG}$ is a distance between the point O and the point G, $\overline{OW_1}$ is a distance between the point O and the point $W_1$, $\overline{OW_2}$ is a distance between the point O and the point $W_2$, Q is a pixel obtained by mapping G, $\overline{OQ}$ is a distance between O and Q, and y is a coefficient with a value range of 0.7≤y≤0.95.

Optionally, in an embodiment, the processing module 520 may be further configured to map a lightness value and a chroma value of a second pixel in a color gamut of the processed image to the target color gamut using a target point that corresponds to the second pixel and that is in the target color gamut as a mapping end point, to obtain a target image, where the target point is located on a lightness axis of the target color gamut, and a lightness value of the target point is the same as that of the second pixel. Further, the second pixel may be mapped based on the following formula, to obtain the target image:

$$\overline{BF'} = \begin{cases} \overline{BF}; \overline{BF} \le i*\overline{BD_2} \\ i*\overline{BD_2} + \dfrac{\overline{BF}-i*\overline{BD_2}}{(1-i)*\overline{BD_2}} *(\overline{BD_1}-i*\overline{BD_2}); \overline{BF} > i*\overline{BD_2} \end{cases},$$

where F is the second pixel, lightness of a point B is the same as that of F, chroma of the point B is 0, $\overline{BF}$ is a distance between the point B and the point F, $D_1$ is an intersection point between $\overline{BF}$ and a boundary of the target color gamut, B is the target point, $\overline{BD_1}$ is a distance between the point B and the point $D_1$, $D_2$ is an intersection point between $\overline{BF}$ and a boundary of the color gamut of the processed image, $\overline{BD_2}$ is a distance between the point B and the point $D_2$, F' is a point obtained by mapping F, $\overline{BF'}$ is a distance between the point B and F', and i is a coefficient with a value range of 0.4≤i≤0.7.

Optionally, in an embodiment, a lightness range of the color gamut of the to-be-processed image is within a lightness range of the target color gamut, and/or a chroma range of the color gamut of the to-be-processed image is within a chroma range of the target color gamut.

It should be understood that the color gamut mapping apparatus 500 may further include a storage module 530 configured to store program code. The processing module 520 is configured to invoke the program code to control the receiving module 510 to implement the method in the foregoing embodiments of this application.

It should be further understood that the color gamut mapping apparatus 500 may include a display module and a photographing module. The display module is configured to display an image and the like. The display module may be a display, for example, a display screen. The photographing module may be a camera or the like.

It should be further understood that functions of the modules of the color gamut mapping apparatus 500 may be implemented in a form of computer software, or may be implemented in a form of electronic hardware, or may be implemented in a manner of combining software and hardware. This is not limited in this embodiment of this application.

Figure 28:
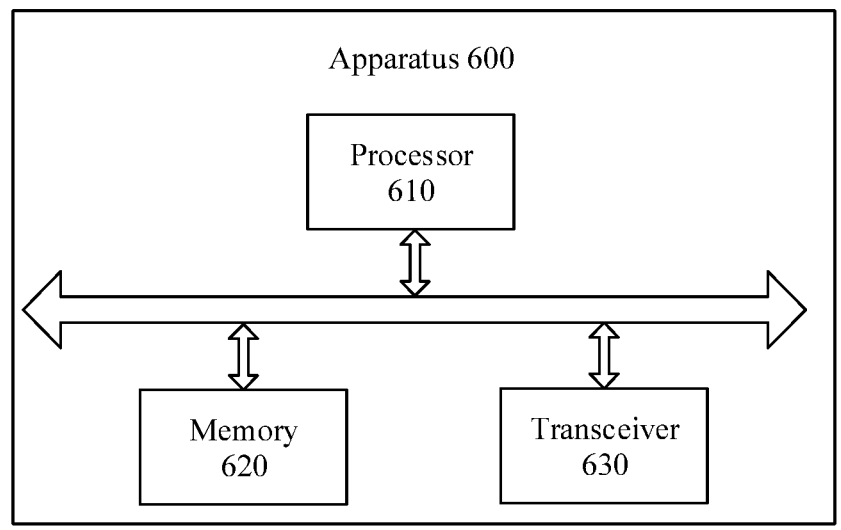
FIG. 28 is a schematic block diagram of a color gamut mapping apparatus according to another embodiment of this application.

It should be noted that, in this embodiment of this application, the processing module 520 may be implemented by a processor, the storage module 530 may be implemented by a memory, and the obtaining module 510 may be implemented by a transceiver. As shown in FIG. 28, a color gamut mapping apparatus 600 may include a processor 610, a memory 620, and a transceiver 630.

The color gamut mapping apparatus 500 shown in FIG. 27 or the color gamut mapping apparatus 600 shown in FIG. 28 can implement the steps of the color gamut mapping method that are shown in FIG. 16, FIG. 18, and FIG. 20. To avoid repetition, details are not described herein again.

Figure 29:
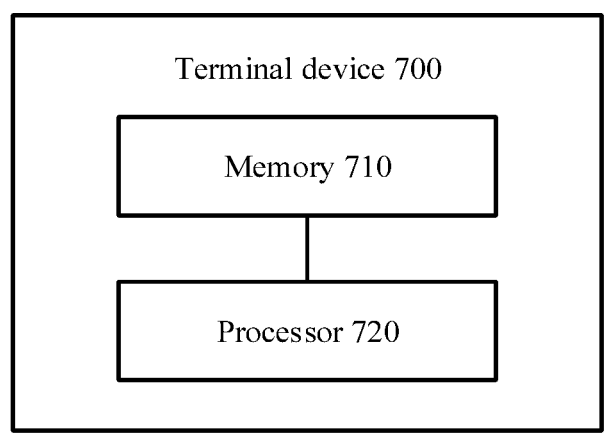
FIG. 29 is a schematic block diagram of a terminal device according to an embodiment of this application.

FIG. 29 is a schematic block diagram of a terminal device according to an embodiment of this application. The terminal device 700 in FIG. 29 includes a memory 710 configured to store a program, and a processor 720 configured to execute the program stored in the memory 710, where when the program is executed, the processor 720 is configured to perform the color gamut mapping method in the embodiments of this application.

Further, when the program stored in the memory 710 is executed, the processor 720 can perform the steps of the color gamut mapping method that are shown in FIG. 6, FIG. 7, FIG. 9, FIG. 16, FIG. 18, and FIG. 20.

It should be understood that the color gamut mapping apparatus 300, 400, 500, or 600 may be a component of the terminal device 700. In this case, any one of the color gamut mapping apparatuses 300, 400, 500, and 600 may be a module that is in the terminal device 700 and that is specially used for image processing.

The terminal device in this embodiment of this application may be user equipment, a mobile device, a user terminal, a wireless communications device, a user agent, or a user apparatus. Alternatively, the terminal device may be a cellular phone, a cordless phone, a personal digital assistant (PDA), a computing device, an in-vehicle device, a wearable device, an image display device, or the like. This is not limited in this embodiment of this application.

It should be understood that the terminal device may further include a display, for example, the display may be a display screen.

It should be further understood that the terminal device may further include a photographing apparatus, for example, the photographing apparatus may be a camera.

It should be further understood that steps performed by the modules in the color gamut mapping apparatus provided in this application can be implemented by electronic hardware or a combination of computer software and electronic hardware.

An embodiment of this application further provides a computer readable medium configured to store computer program code. The computer program includes an instruction used to perform the color gamut mapping method in the embodiments of this application shown in FIG. 6, FIG. 7, FIG. 9, FIG. 16, FIG. 18, and FIG. 20. The readable medium may be a ROM or a RAM. This is not limited in this embodiment of this application.

An embodiment of this application further provides a system chip. The system chip includes a processing unit and a communications unit. For example, the processing unit may be a processor, and the communications unit may be an input/output interface, a pin, or a circuit. The processing unit may execute a computer instruction such that a chip in the terminal performs any color gamut mapping method.

Optionally, the computer instruction is stored in a storage unit.

Optionally, the storage unit is a storage unit in the chip, for example, a register or a cache. Alternatively, the storage unit may be a storage unit that is in the terminal and that is located outside the chip, for example, a ROM, another type of static storage device that can store static information and an instruction, or a RAM. Any aforementioned processor may be a CPU, a microprocessor, an ASIC, or one or more integrated circuits configured to control execution of a program for the foregoing virtual reality text display method.

An embodiment of this application further provides a computer program product. The product includes an instruction used to perform the color gamut mapping method in any one of the foregoing embodiments.

It should be understood that the foregoing descriptions of the embodiments of this application emphasize differences between the embodiments. For same or similar parts that are not mentioned, refer to the embodiments. For brevity, details are not described herein again.

It should be further understood that, the term "and/or" and "at least one of A or B" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A color gamut mapping method comprising:
obtaining a to-be-processed image;
obtaining lightness and chroma information of a target color gamut;
performing a first mapping of a lightness value of a first pixel in the to-be-processed image to a mapped lightness value of a second pixel in a processed image using a point with a minimum lightness value in the target color gamut as a mapping end point, wherein the processed image corresponds to the target color gamut, and wherein the first pixel is in a first color gamut of the to-be-processed image;

performing a second mapping of a chroma value of the first pixel to a mapped chroma value of the second pixel using the point as the mapping end point; and obtaining the processed image based on the first mapping and the second mapping.

2. The color gamut mapping method of claim 1, further comprising:

obtaining a current image;

performing lightness mapping on a third pixel in a second color gamut of the current image to obtain a third color gamut, wherein a first lightness range of the third color gamut is the same as a second lightness range of the target color gamut; and mapping the third pixel to the third color gamut to obtain the to-be-processed image.

3. The color gamut mapping method of claim 2, further comprising maintaining a chroma of the third pixel unchanged when performing the lightness mapping on the third pixel.

4. The color gamut mapping method of claim 2, further comprising performing the lightness mapping on the third pixel based on a first formula to obtain the third color gamut, wherein the first formula is as follows:

$$L'_C = \frac{L_C - \min(L_o)}{\max(L_o) - \min(L_o)} * (\max(L_r) - \min(L_r)) + \min(L_r),$$

wherein C is the third pixel, wherein $L_C$ is a lightness of C, wherein $\min(L_o)$ is a minimum lightness value of the second color gamut, wherein $\max(L_o)$ is a maximum lightness value of the second color gamut, wherein $\min(L_r)$ is the minimum lightness value of the target color gamut, wherein $\max(L_r)$ is a maximum lightness value of the target color gamut, wherein C' is a point obtained by mapping C using the first formula, and wherein $L_C'$ is a lightness of C'.

5. The color gamut mapping method of claim 2, further comprising mapping the third pixel to the third color gamut based on a second formula to obtain the to-be-processed image, wherein the second formula is as follows:

$$\overline{MN'} = \begin{cases} \overline{MN}; \overline{MN} \le t*\overline{MS_1} \\ t*\overline{MS_1} + \frac{\overline{MN} - t*\overline{MS_1}}{\overline{MS_2} - t*\overline{MS_1}} *(1-t)*\overline{MS_1}; \overline{MN} > t*\overline{MS_1} \end{cases},$$

wherein M is the mapping end point, wherein a lightness of M is half of a sum of a minimum lightness value and a maximum lightness value of the second color gamut, wherein a chroma of M is zero, wherein N is the third pixel, wherein $\overline{MN}$ is a distance between the M and the N, wherein $S_1$ is an intersection point between $\overline{MN}$ and a boundary of the third color gamut, wherein $S_2$ is an intersection point between $\overline{MN}$ and a boundary of the second color gamut, wherein $\overline{MS_1}$ is a distance between M and $S_1$, wherein $\overline{MS_2}$ is a distance between M and $S_2$, wherein N' is a point obtained by mapping N, wherein $\overline{MN}$, is a distance between M and N', and wherein t is a coefficient with a value range of 0.7≤t≤0.95.

6. The color gamut mapping method of claim 1, further comprising mapping a lightness value and a chroma value of a fourth pixel in a third color gamut of the processed image to the target color gamut using a target point that corresponds to the fourth pixel and that is in the target color gamut as a second mapping end point to obtain a target image, wherein the target point is located on a lightness axis of the target color gamut, and wherein a lightness value of the target point is the same as the lightness value of the fourth pixel.

7. The color gamut mapping method of claim 6, further comprising mapping, based on a third formula, the third pixel to the target color gamut to obtain the target image, wherein the third formula is as follows:

$$\overline{AZ'} = \begin{cases} \overline{AZ}; \overline{AZ} \le k*\overline{AX_1} \\ k*\overline{AX_1} + \frac{\overline{AZ} - k*\overline{AX_1}}{\overline{AX_2} - k*\overline{AX_1}} *(1-k)*\overline{AX_1}; \overline{AZ} > k*\overline{AX_1} \end{cases},$$

wherein A is the mapping end point, wherein Z is the third pixel, wherein a lightness of A is the same as a lightness of Z, wherein a chroma of A is zero, wherein $\overline{AZ}$ is a distance between A and Z, wherein $X_1$ is an intersection point between $\overline{AZ}$ and a boundary of the target color gamut, wherein $\overline{AX_1}$ is a distance between A and $X_1$, wherein $X_2$ is an intersection point between $\overline{AZ}$ and a boundary of the third color gamut, wherein $\overline{AX_2}$ is a distance between A and $X_2$, wherein Z' is a point obtained by mapping Z, wherein $\overline{AZ'}$ is a distance between A and Z', and wherein k is a coefficient with a value range of 0.7≤k≤0.95.

8. The color gamut mapping method of claim 1, further comprising performing, based on a fourth formula, mapping the lightness value and the chroma value of the first pixel to obtain the processed image, wherein the fourth formula is as follows:

$$\overline{EP'} = \begin{cases} \overline{EP}; \overline{EP} \le k*\overline{EP_d} \\ k*\overline{EP_d} + \frac{\overline{EP} - k*\overline{EP_d}}{\overline{EP_s} - k*\overline{EP_d}} *(1-k)*\overline{EP_d}; \overline{EP} > k*\overline{EP_d} \end{cases},$$

wherein E is the mapping end point, wherein a lightness of E is the minimum lightness value of the target color gamut, wherein a chroma of E is zero, wherein P is the first pixel, wherein $\overline{EP}$ is a distance between P and E, wherein $P_d$ is an intersection point between $\overline{EP}$ and a boundary of the target color gamut, wherein $\overline{EP_d}$ is a distance between E and $P_d$, wherein $P_s$ is an intersection point between $\overline{EP}$ and a boundary of the first color gamut, wherein $\overline{EP_s}$ is a distance between E and $P_s$, wherein P' is a point that is in the processed image corresponding to the target color gamut and that is obtained by mapping P using the fourth formula, wherein $\overline{EP'}$ is a distance between E and P', and wherein k is a coefficient with a value range of 0.7≤k≤0.95.

9. A color gamut mapping apparatus comprising:

a transceiver configured to:

obtain a to-be-processed image; and obtain lightness and chroma information of a target color gamut; and a processor coupled to the transceiver and configured to:

perform a first map of a lightness value of a first pixel in the to-be-processed image to a mapped lightness value of a second pixel in a processed image using a point with a minimum lightness value in the target color gamut as a mapping end point, wherein the processed image corresponds to the target color gamut, and wherein the first pixel is in a first color gamut of the to-be-processed image;

perform a second map of a chroma value of the first pixel to a mapped chroma value of the second pixel using the point as the mapping end point; and obtain the processed image based on the first mapping and the second mapping.

10. The color gamut mapping apparatus of claim 9, wherein the transceiver is further configured to obtain a current image, and wherein the processor is further configured to:

perform lightness mapping on a third pixel in a second color gamut of the current image to obtain a third color gamut, wherein a first lightness range of the third color gamut is the same as a second lightness range of the target color gamut; and map the third pixel to the third color gamut to obtain the to-be-processed image.

11. The color gamut mapping apparatus of claim 10, wherein the process is further configured to maintain a chroma of the third pixel unchanged when performing the lightness mapping on the third pixel.

12. The color gamut mapping apparatus of claim 10, wherein the processor is further configured to perform, based on a first formula, the lightness mapping on the third pixel to obtain the third color gamut, wherein the first formula is as follows:

$$L'_C = \frac{L_C - \min(L_o)}{\max(L_o) - \min(L_o)} * (\max(L_r) - \min(L_r)) + \min(L_r),$$

wherein C is the third pixel, wherein $L_C$ is a lightness of C, wherein $\min(L_o)$ is a minimum lightness value of the second color gamut, wherein $\max(L_o)$ is a maximum lightness value of the second color gamut, wherein $\min(L_r)$ is the minimum lightness value of the target color gamut, wherein $\max(L_r)$ is a maximum lightness value of the target color gamut, wherein C' is a point obtained by mapping C using the first formula, and wherein $L_C'$ is a lightness of C'.

13. The color gamut mapping apparatus of claim 10, wherein the processor is further configured to map the third pixel to the third color gamut based on a second formula to obtain the to-be-processed image, wherein the second formula is as follows:

$$\overline{MN'} = \begin{cases} \overline{MN}; \overline{MN} \le t * \overline{MS_1} \\ t * \overline{MS_1} + \frac{\overline{MN} - t * \overline{MS_1}}{\overline{MS_2} - t * \overline{MS_1}} * (1-t) * \overline{MS_1}; \overline{MN} > t * \overline{MS_1} \end{cases},$$

wherein M is the mapping end point, wherein a lightness of M is half of a sum of a minimum lightness value and a maximum lightness value of the second color gamut, wherein a chroma of M is zero, wherein N is the third pixel, wherein $\overline{MN}$ is a distance between the point M and the point N, wherein $S_1$ is an intersection point between $\overline{MN}$ and a boundary of the third color gamut, wherein $S_2$ is an intersection point between $\overline{MN}$ and a boundary of the second color gamut, wherein $\overline{MS_1}$ is a distance between M and $S_1$, wherein $\overline{MS_2}$ is a distance between M and $S_2$, wherein N' is a point obtained by mapping N, wherein $\overline{MN'}$ is a distance between M and N', and wherein t is a coefficient with a value range of $0.7 \le t \le 0.95$.

14. The color gamut apparatus of claim 9, wherein the processor is further configured to map a lightness value and a chroma value of a fourth pixel in a third color gamut of the processed image to the target color gamut using a target point that corresponds to the fourth pixel and that is in the target color gamut as a second mapping end point to obtain a target image, wherein the target point is located on a lightness axis of the target color gamut, and wherein a lightness value of the target point is the same as the lightness value of the fourth pixel.

15. The apparatus of claim 14, wherein the processor is further configured to map, based on a third formula, the third pixel to the target color gamut to obtain the target image, and wherein the third formula is as follows:

$$\overline{AZ'} = \begin{cases} \overline{AZ}; \overline{AZ} \le k * \overline{AX_1} \\ k * \overline{AX_1} + \frac{\overline{AZ} - k * \overline{AX_1}}{\overline{AX_2} - k * \overline{AX_1}} * (1-k) * \overline{AX_1}; \overline{AZ} > k * \overline{AX_1} \end{cases},$$

wherein A is the mapping end point, Z is the third pixel, wherein a lightness of A is the same as a lightness of Z, wherein a chroma of A is zero, wherein $\overline{AZ}$ is a distance between A and Z, wherein $X_1$ is an intersection point between $\overline{AZ}$ and a boundary of the target color gamut, wherein $\overline{AX_1}$ is a distance between A and $X_1$, wherein $X_2$ is an intersection point between $\overline{AZ}$ and a boundary of the third color gamut, wherein $\overline{AX_2}$ is a distance between A and $X_2$, wherein Z' is a point obtained by mapping Z, wherein $\overline{AZ'}$ is a distance between A and Z', and wherein k is a coefficient with a value range of $0.7 \le k \le 0.95$.

16. The color gamut apparatus of claim 9, wherein the processor is further configured to map, based on a fourth formula, the lightness value and the chroma value of the first pixel to obtain the processed image, and wherein the fourth formula is as follows:

$$\overline{EP'} = \begin{cases} \overline{EP}; \overline{EP} \le k * \overline{EP_d} \\ k * \overline{EP_d} + \frac{\overline{EP} - k * \overline{EP_d}}{\overline{EP_s} - k * \overline{EP_d}} * (1-k) * \overline{EP_d}; \overline{EP} > k * \overline{EP_d} \end{cases},$$

wherein E is the mapping end point, wherein a lightness of E is the minimum lightness value of the target color gamut, wherein a chroma of E is zero, wherein P is the first pixel, wherein $\overline{EP}$ is a distance between P and E, wherein $P_d$ is an intersection point between $\overline{EP}$ and a boundary of the target color gamut, wherein $\overline{EP_d}$ is a distance between E and $P_d$, wherein $P_s$ is an intersection point between $\overline{EP}$ and a boundary of the first color gamut, wherein $\overline{EP_s}$ is a distance between E and $P_s$, wherein P' is a point that is in the processed image corresponding to the target color gamut and that is obtained by mapping P using the fourth formula, wherein $\overline{EP'}$ is a distance between E and P', and wherein k is a coefficient with a value range of $0.7 \le k \le 0.95$.

17. A terminal device comprising:

a memory configured to store a program; and a processor coupled to the memory, wherein the program causes the processor to be configured to:

obtain a to-be-processed image;

obtain lightness and chroma information of a target color gamut;

map a lightness value of a first pixel in the to-be-processed image to a mapped lightness value of a second pixel in a processed image using a point with a minimum lightness value in the target color gamut as a mapping end point, wherein the processed image corresponds to the target color gamut, and wherein the first pixel is in a first color gamut of the to-be-processed image;

map a chroma value of the first pixel to a mapped chroma value of the second pixel using the point as the mapping end point; and obtain the processed image based on mapping.

18. The terminal of claim 17, wherein the program further causes the processor to be configured to:

obtain a current image;

perform lightness mapping on a third pixel in a second color gamut of the current image to obtain a third color gamut, wherein a first lightness range of the third color gamut is the same as a second lightness range of the target color gamut; and map the third pixel to the third color gamut to obtain the to-be-processed image.

19. The terminal of claim 18, wherein the program further causes the processor to be configured to maintain a chroma of the third pixel unchanged when performing the lightness mapping on the third pixel.

20. A computer program product comprising computer-executable instructions for storage on a non-transitory computer-readable storage medium that, when executed by a processor, cause an apparatus to:

obtain a to-be-processed image;

obtain lightness and chroma information of a target color gamut;

map a lightness value of a first pixel in the to-be-processed image to a mapped lightness value of a second pixel in a processed image using a point with a minimum lightness value in the target color gamut as a mapping end point, wherein the processed image corresponds to the target color gamut, and wherein the first pixel is in a first color gamut of the to-be-processed image;

map a chroma value of the first pixel to a mapped chroma value of the second pixel using the point as the mapping end point; and obtain the processed image based on mapping.

* * * * *